United States Patent
Lim

(10) Patent No.: US 8,894,489 B2
(45) Date of Patent: Nov. 25, 2014

(54) TOUCH USER INTERFACE SUPPORTING GLOBAL AND CONTEXT-SPECIFIC TOUCH GESTURES THAT ARE RESPONSIVE TO AT LEAST ONE FINGER ANGLE

(71) Applicant: Lester F. Ludwig, Belmont, CA (US)

(72) Inventor: Seung E. Lim, Belmont, CA (US)

(73) Assignee: Lester F. Ludwig, San Antonio, TX (US)

( * ) Notice: Subject to any disclaimer, the term of this patent is extended or adjusted under 35 U.S.C. 154(b) by 0 days.

(21) Appl. No.: 14/198,482

(22) Filed: Mar. 5, 2014

(65) Prior Publication Data
US 2014/0195907 A1 Jul. 10, 2014

Related U.S. Application Data

(63) Continuation of application No. 13/731,946, filed on Dec. 31, 2012, now Pat. No. 8,702,513, which is a continuation of application No. 12/502,230, filed on Jul. 13, 2009, now Pat. No. 8,345,014.

(60) Provisional application No. 61/080,232, filed on Jul. 12, 2008.

(51) Int. Cl.
| | |
|---|---|
| A63F 13/06 | (2006.01) |
| G06F 3/0488 | (2013.01) |
| A63F 13/20 | (2014.01) |
| A63F 13/40 | (2014.01) |
| G06F 3/0354 | (2013.01) |
| G06F 3/01 | (2006.01) |
| G06F 3/0481 | (2013.01) |

(52) U.S. Cl.
CPC .......... *G06F 3/0488* (2013.01); *G06F 3/04883* (2013.01); *A63F 2300/6045* (2013.01); *A63F 13/06* (2013.01); *A63F 13/10* (2013.01); *A63F 2300/6676* (2013.01); *G06F 3/03547* (2013.01); *A63F 2300/1075* (2013.01); *G06F 3/016* (2013.01); *G06F 3/04815* (2013.01)
USPC .............................................. 463/37; 463/31

(58) Field of Classification Search
CPC ................ A63F 2300/1068; A63F 2300/1075; A63F 2009/2408; A63F 2009/241; A63F 13/06; G06F 3/03547; G06F 3/041; G06F 3/0416; G06F 3/0426; G06F 3/0428; G06F 3/0488; G06F 1/1643; G06F 1/169; G06F 1/1692; G06F 3/016; H04N 5/23216
USPC ....................... 463/30, 31, 36, 37; 348/14.03; 379/93.19, 916
See application file for complete search history.

(56) References Cited

U.S. PATENT DOCUMENTS 4,748,676 A 5/1988 Miyagawa
(Continued)

FOREIGN PATENT DOCUMENTS

EP 0 574 213 A1 12/1993

OTHER PUBLICATIONS

Dulberg, M. S., et al. An Imprecise Mouse Gesture for the Fast Activation of Controls, IOS Press, Aug. 1999, [online] [retrieved on Jul. 9, 2013] URL: http://www.csc.ncsu.edu/faculty/stamant/papers/interact.pdf.gz, 10 pgs.

(Continued)

*Primary Examiner* — David L Lewis
*Assistant Examiner* — Matthew D Hoel
(74) *Attorney, Agent, or Firm* — Procopio, Cory, Hargreaves & Savitch LLP

(57) ABSTRACT

A user interface method for use with a touch gesture user interface in a system implementing global or universal gestures and application-specific gestures for the control of software executing on a device comprising a touch user interface and a computational processor wherein the touch gestures are responsive to at least one finger angle. In an example implementation, wherein when a gesture with an application-specific association is recognized, the user interface operation is determined by the software application that has a currently active user-interface focus. In an example implementation, a global or universal gesture is used to control the system. In an example implementation, a global or universal gesture is used to control a software application executing on the system. In an example implementation, the user interface operation is context-specific.

20 Claims, 23 Drawing Sheets

(56) References Cited

U.S. PATENT DOCUMENTS

| | | |
|---|---|---|
| 4,899,137 A | 2/1990 | Behrens et al. |
| 4,988,981 A | 1/1991 | Zimmerman |
| 5,168,531 A | 12/1992 | Sigel |
| 5,203,704 A | 4/1993 | McCloud |
| 5,214,615 A | 5/1993 | Bauer |
| 5,237,647 A | 8/1993 | Roberts et al. |
| 5,270,711 A | 12/1993 | Knapp |
| 5,292,999 A | 3/1994 | Tumura |
| 5,341,133 A | 8/1994 | Savoy |
| 5,342,054 A | 8/1994 | Chang |
| 5,347,295 A | 9/1994 | Agulnick et al. |
| 5,357,048 A | 10/1994 | Sgroi |
| 5,378,850 A | 1/1995 | Tumura |
| 5,386,219 A | 1/1995 | Greanias |
| 5,420,936 A | 5/1995 | Fitzpatrick |
| 5,440,072 A | 8/1995 | Willis |
| 5,442,168 A | 8/1995 | Gurner et al. |
| 5,454,043 A | 9/1995 | Freeman |
| 5,459,282 A | 10/1995 | Willis |
| 5,471,008 A | 11/1995 | Fujita et al. |
| 5,475,214 A | 12/1995 | DeFranco et al. |
| 5,483,261 A | 1/1996 | Yasutake |
| 5,531,227 A | 7/1996 | Schneider |
| 5,565,641 A | 10/1996 | Gruenbaum |
| 5,585,588 A | 12/1996 | Tumura |
| 5,592,572 A | 1/1997 | Le |
| 5,592,752 A | 1/1997 | Fu |
| 5,594,469 A | 1/1997 | Freeman |
| 5,598,208 A | 1/1997 | McClintock |
| 5,617,855 A | 4/1997 | Waletzky |
| 5,625,704 A | 4/1997 | Prasad |
| 5,659,145 A | 8/1997 | Weil |
| 5,659,466 A | 8/1997 | Norris et al. |
| 5,659,625 A | 8/1997 | Marquardt |
| 5,662,111 A | 9/1997 | Cosman |
| 5,665,927 A | 9/1997 | Taki et al. |
| 5,668,338 A | 9/1997 | Hewitt et al. |
| 5,675,100 A | 10/1997 | Hewlett |
| 5,703,303 A | 12/1997 | Stewart |
| 5,717,939 A | 2/1998 | Bricklin et al. |
| 5,719,347 A | 2/1998 | Masubachi et al. |
| 5,719,561 A | 2/1998 | Gonzales |
| 5,724,985 A | 3/1998 | Snell |
| 5,741,993 A | 4/1998 | Kushimiya |
| 5,748,184 A | 5/1998 | Shieh |
| 5,763,806 A | 6/1998 | Willis |
| 5,786,540 A | 7/1998 | Westlund |
| 5,801,340 A | 9/1998 | Peter |
| 5,805,137 A | 9/1998 | Yasutake |
| 5,808,605 A | 9/1998 | Shieh |
| 5,824,930 A | 10/1998 | Ura et al. |
| 5,827,989 A | 10/1998 | Fay et al. |
| 5,841,428 A | 11/1998 | Jaeger et al. |
| 5,850,051 A | 12/1998 | Machover et al. |
| 5,852,251 A | 12/1998 | Su et al. |
| 5,870,083 A | 2/1999 | Shieh |
| 5,889,236 A | 3/1999 | Gillespie et al. |
| 5,932,827 A | 8/1999 | Osborne et al. |
| 5,969,283 A | 10/1999 | Looney et al. |
| 5,977,466 A | 11/1999 | Muramatsu |
| 5,986,224 A | 11/1999 | Kent |
| 6,002,808 A | 12/1999 | Freeman |
| 6,005,545 A | 12/1999 | Nishida et al. |
| 6,037,937 A | 3/2000 | Beaton |
| 6,047,073 A | 4/2000 | Norris et al. |
| 6,051,769 A | 4/2000 | Brown, Jr. |
| 6,069,326 A | 5/2000 | Henson |
| 6,071,193 A | 6/2000 | Suzuoki |
| 6,100,461 A | 8/2000 | Hewitt |
| 6,107,997 A | 8/2000 | Ure |
| 6,140,565 A | 10/2000 | Yamauchi et al. |
| 6,204,441 B1 | 3/2001 | Asahi et al. |
| 6,225,975 B1 | 5/2001 | Furuki et al. |
| 6,256,046 B1 | 7/2001 | Waters |
| 6,278,443 B1 | 8/2001 | Amro |
| 6,285,358 B1 | 9/2001 | Roberts |
| 6,288,317 B1 | 9/2001 | Willis |
| 6,310,279 B1 | 10/2001 | Suzuki et al. |
| 6,310,610 B1 | 10/2001 | Beaton et al. |
| 6,320,112 B1 | 11/2001 | Lotze |
| 6,323,846 B1 | 11/2001 | Westerman et al. |
| 6,360,019 B1 | 3/2002 | Chaddha |
| 6,363,159 B1 | 3/2002 | Rhoads |
| 6,373,475 B1 | 4/2002 | Challis |
| 6,392,636 B1 | 5/2002 | Ferrari |
| 6,392,705 B1 | 5/2002 | Chaddha |
| 6,400,836 B2 | 6/2002 | Senior |
| 6,404,898 B1 | 6/2002 | Rhoads |
| 6,408,087 B1 | 6/2002 | Kramer |
| 6,433,801 B1 | 8/2002 | Moon |
| 6,509,847 B1 | 1/2003 | Anderson |
| 6,570,078 B2 | 5/2003 | Ludwig |
| 6,610,917 B2 * | 8/2003 | Ludwig ..................... 84/726 |
| 6,703,552 B2 | 3/2004 | Haken |
| 6,793,619 B1 | 9/2004 | Blumental |
| 7,030,860 B1 | 4/2006 | Hsu et al. |
| 7,408,108 B2 | 8/2008 | Ludwig |
| 7,557,797 B2 | 7/2009 | Ludwig |
| 7,598,949 B2 | 10/2009 | Han |
| 7,611,409 B2 | 11/2009 | Muir et al. |
| 7,936,341 B2 | 5/2011 | Weiss |
| 8,049,730 B2 | 11/2011 | Joguet |
| 8,154,529 B2 | 4/2012 | Sleeman |
| 8,169,414 B2 | 5/2012 | Lim |
| 8,170,346 B2 | 5/2012 | Ludwig |
| 8,179,376 B2 | 5/2012 | Griffin |
| 8,345,014 B2 | 1/2013 | Lim |
| 2001/0012000 A1 | 8/2001 | Eberhard |
| 2001/0036299 A1 | 11/2001 | Senior |
| 2002/0005108 A1 | 1/2002 | Ludwig |
| 2002/0093491 A1 | 7/2002 | Gillespie et al. |
| 2003/0003976 A1 * | 1/2003 | Mura ..................... 463/1 |
| 2003/0151592 A1 | 8/2003 | Ritter |
| 2004/0074379 A1 | 4/2004 | Ludwig |
| 2004/0118268 A1 | 6/2004 | Ludwig |
| 2004/0245438 A1 | 12/2004 | Payne |
| 2004/0251402 A1 | 12/2004 | Reime |
| 2005/0078085 A1 | 4/2005 | Casebolt |
| 2005/0179651 A1 | 8/2005 | Ludwig |
| 2006/0086896 A1 | 4/2006 | Han |
| 2006/0250353 A1 | 11/2006 | Yasutake |
| 2006/0252530 A1 | 11/2006 | Oberberger et al. |
| 2006/0267957 A1 | 11/2006 | Kolmykov-Zotov |
| 2007/0044019 A1 | 2/2007 | Moon |
| 2007/0063990 A1 | 3/2007 | Park |
| 2007/0216641 A1 | 9/2007 | Young |
| 2007/0229477 A1 | 10/2007 | Ludwig |
| 2007/0236477 A1 | 10/2007 | Ryu |
| 2007/0291009 A1 | 12/2007 | Wright |
| 2008/0001925 A1 | 1/2008 | XiaoPing |
| 2008/0010616 A1 | 1/2008 | Algreatly |
| 2008/0012832 A1 | 1/2008 | GuangHai |
| 2008/0034286 A1 | 2/2008 | Selby |
| 2008/0055263 A1 | 3/2008 | Lemay |
| 2008/0091453 A1 | 4/2008 | Meehan |
| 2008/0122796 A1 | 5/2008 | Jobs et al. |
| 2008/0143690 A1 | 6/2008 | Jang |
| 2008/0158172 A1 | 7/2008 | Hotelling |
| 2008/0164076 A1 | 7/2008 | Orsley |
| 2008/0168403 A1 | 7/2008 | Westerman |
| 2008/0259053 A1 | 10/2008 | Newton |
| 2008/0297482 A1 | 12/2008 | Weiss |
| 2008/0300055 A1 | 12/2008 | Lutnick |
| 2008/0309634 A1 | 12/2008 | Hotelling et al. |
| 2009/0002333 A1 | 1/2009 | Maxwell |
| 2009/0006292 A1 | 1/2009 | Block |
| 2009/0027351 A1 | 1/2009 | Zhang et al. |
| 2009/0051659 A1 | 2/2009 | Mickelborough |

(56) References Cited

U.S. PATENT DOCUMENTS

| | | | |
|---|---|---|---|
| 2009/0124348 A1 | 5/2009 | Yoseloff et al. |
| 2009/0146968 A1 | 6/2009 | Narita et al. |
| 2009/0167701 A1 | 7/2009 | Ronkainen |
| 2009/0254869 A1 | 10/2009 | Ludwig |
| 2010/0013860 A1 | 1/2010 | Mandella |
| 2010/0044121 A1 | 2/2010 | Simon |
| 2010/0060607 A1 | 3/2010 | Ludwig |
| 2010/0073318 A1 | 3/2010 | Hu |
| 2010/0079385 A1 | 4/2010 | Holmgren |
| 2010/0079405 A1 | 4/2010 | Bernstein |
| 2010/0087241 A1 | 4/2010 | Nguyen et al. |
| 2010/0090963 A1 | 4/2010 | Dubs |
| 2010/0110025 A1 | 5/2010 | Lim |
| 2010/0117978 A1 | 5/2010 | Shirado |
| 2010/0177118 A1 | 7/2010 | Sytnikov |
| 2010/0231612 A1 | 9/2010 | Chaudhri et al. |
| 2010/0232710 A1 | 9/2010 | Ludwig |
| 2010/0289754 A1 | 11/2010 | Sleeman et al. |
| 2010/0302172 A1 | 12/2010 | Wilairat |
| 2010/0315337 A1 | 12/2010 | Ferren |
| 2010/0328032 A1 | 12/2010 | Rofougaran |
| 2011/0007000 A1 | 1/2011 | Lim |
| 2011/0037735 A1 | 2/2011 | Land |
| 2011/0057953 A1 | 3/2011 | Horodezky |
| 2011/0063251 A1 | 3/2011 | Geaghan |
| 2011/0066984 A1 | 3/2011 | Li |
| 2011/0084928 A1 | 4/2011 | Chang |
| 2011/0086706 A1 | 4/2011 | Zalewski |
| 2011/0170745 A1 | 7/2011 | Chen |
| 2011/0202889 A1 | 8/2011 | Ludwig |
| 2011/0202934 A1 | 8/2011 | Ludwig |
| 2011/0260998 A1 | 10/2011 | Ludwig |
| 2011/0261049 A1 | 10/2011 | Cardno et al. |
| 2011/0285648 A1 | 11/2011 | Simon et al. |
| 2012/0007821 A1 | 1/2012 | Zaliva |
| 2012/0034978 A1 | 2/2012 | Lim |
| 2012/0050185 A1 | 3/2012 | Davydov |
| 2012/0056846 A1 | 3/2012 | Zaliva |
| 2012/0106782 A1 | 5/2012 | Nathan |
| 2012/0108323 A1 | 5/2012 | Kelly et al. |
| 2012/0133484 A1 | 5/2012 | Griffin |
| 2012/0192119 A1 | 7/2012 | Zaliva |
| 2012/0194461 A1 | 8/2012 | Lim |
| 2012/0194462 A1 | 8/2012 | Lim |
| 2012/0195522 A1 | 8/2012 | Ludwig |
| 2012/0223903 A1 | 9/2012 | Ludwig |
| 2012/0235940 A1 | 9/2012 | Ludwig |
| 2012/0262401 A1 | 10/2012 | Rofougaran |
| 2012/0280927 A1 | 11/2012 | Ludwig |
| 2012/0317521 A1 | 12/2012 | Ludwig |
| 2013/0004016 A1 | 1/2013 | Karakotsios |
| 2013/0009896 A1 | 1/2013 | Zaliva |
| 2013/0038554 A1 | 2/2013 | West |

OTHER PUBLICATIONS

Moyle, M., et al., A Flick in the Right Direction: A Case Study of Gestural Input, Conferences in Research and Practice in Information Technology, vol. 18, Jan. 2005; New Zealand, [online] [retrieved on Jul. 9, 2013] URL:http://www.cosc.canterbury.ac.nz/andrew.cockburn/papers/moyle-cockburn.pdf, 27 pgs.

Maltoni, D., et al., Handbook of Fingerprint Recognition, Springer Professional Computing, 2nd ed. 2009, XVI, p. 74, p. 361, [online] [retrieved on Jul. 9, 2013] URL: http://books.google.com/books?id=1Wpx25D8qOwC&pg=PA361&Ipg=PA361&dq=fingerprint+minutiae, 2 pgs.

VeriFinger Information, [online] [retrieved on Jun. 11, 2013] URL: http://www.fingerprint-it.com/_sol_verifinger.html, 2 pgs.

Prabhakar S., et al., Learning fingerprint minutiae location and type, Pattern Recognition 2003, 36, [online] URL: http://www.cse.msu.edu/biometrics/Publications/Fingerprint/PrabhakarJainPankanti_MinaLocType_PR03.pdf, pp. 1847-1857.

Garcia Reyes, E., An Automatic Goodness Index to Measure Fingerprint Minutiae Quality, Progress in Pattern Recognition, Image Analysis and Applications, Lecture Notes in Computer Science vol. 3773, 2005, pp. 578-585, [online] [retrieved on Jun. 2, 2013] URL: http://www.researchgate.net/publication/226946511_An_Automatic_Goodness_Index_to_Measure_Fingerprint_Minutiae_Quality/file/d912f50ba5e96320d5.pdf.

Kayaoglu, M., et al., Standard Fingerprint Databases: Manual Minutiae Labeling and Matcher Performance Analyses, arXiv preprint arXiv:1305.1443, 2013, 14 pgs, [online] [retrieved on Jun. 2, 2013] URL: http://arxiv.org/ftp/arxiv/papers/1305/1305.1443.pdf.

Alonso-Fernandez, F., et al., Fingerprint Recognition, Chapter 4, Guide to Biometric Reference Systems and Performance Evaluation, (Springer, London, 2009, pp. 51-90, [online] [retrieved on Jun. 2, 2013] URL: http://www2.hh.se/staff/josef/public/publications/alonso-fernandez09chapter.pdf.

Image moment, Jul. 12, 2010, 3 pgs, [online] [retrieved on Jun. 13, 2013] URL: http://en.wikipedia.org/wiki/Image_moment.

Nguyen, N., et al., Comparisons of sequence labeling algorithms and extensions, Proceedings of the 24th International Conference on Machine Learning, 2007, [online] [retrieved on Jun. 2, 2013] URL: http://www.cs.cornell.edu/~nhnguyen/icml07structured.pdf, pp. 681-688.

Nissen, S., Implementation of a Fast Artificial Neural Network Library (FANN), Department of Computer Science University of Copenhagen (DIKU)}, Oct. 31, 2003, [online] [retrieved on Jun. 21, 2013] URL: http://mirror.transact.net.au/sourceforge/f/project/fa/fann/fann_doc/1.0/fann_doc_complete_1.0.pdf, 92 pgs.

Igel, C., et al., Improving the Rprop Learning Algorithm, Proceedings of the Second International ICSC Symposium on Neural Computation (NC 2000), 2000, 2000, [online] [retrieved on Jun. 2, 2013] URL: http://citeseerx.ist.psu.edu/viewdoc/download?doi=10.1.1.17.3899&rep=rep1&type=pdf, pp. 115-121.

Bishop, C.M., Pattern Recognition and Machine Learning, Springer New York, 2006, pp. 561-593.

Euler Angles, 2011, [online] [retrieved on Jun. 30, 2011] URL: http://en.wikipedia.org/w/index.php?title=Euler_angles&oldid=436460926, 8 pgs.

Electronic Statistics Textbook, StatSoft, Inc., 2011, [online] [retrieved on Jul. 1, 2011] URL: http://www.statsoft.com/textbook, 1 pg.

Central Moment, Dec. 16, 2009, [online] [retrieved on Oct. 26, 2010] URL: http://en.wikipedia.org/w/index.php?title=Central_moment&oldid=332048374.

Local regression, Nov. 16, 2010, [online] [retrieved on Jun. 28, 2011] URL: http://en.wikipedia.org/w/index.php?title=Local_regression&oldid=416762287.

USPTO Notice of Allowance dated Jun. 6, 2013 issued in U.S. Appl. No. 13/846,830, filed Mar. 18, 2013.

Hernandez-Leon, R., et al., Classifying using Specific Rules with High Confidence, 9th Mexican International Conference on Artificial Intelligence, IEEE, Nov. 2010, pp. 75-80.

Fang, Y., et al., Dynamics of a Winner-Take-All Neural Network, Neural Networks, 9(7), Oct. 1996, pp. 1141-1154.

Krueger, M. W., et al., Videoplace—An Artificial Reality, Proceeding, CHI '85 Proceedings of the SIGCHI Conference on Human Factors in Computing Systems, pp. 35-40, ACM New York, NY, USA, Apr. 1985.

Krueger, M. W., ACM Siggraph Touchware, Pioneers, [online] [retrieved on Nov. 19, 2013] URL: http://www.siggraph.org/artdesign/gallery/S98/pione/pione3/krueger.html, last updated 1999, 1 pg.

Videoplace, [online] [retrieved on Nov. 19, 2013] URL: http://en.wikipedia.org/Videoplace, last updated Sep. 3, 2013, 1 pg.

Artmuseum.net, Pioneers, Myron Krueger, Responsive 1970, [online] [retrieved on Nov. 19, 2013] URL: http://web.archive.org/web/20070929094921/http://www.artmuseum.net/w2vr/timeline/Krueger.html, Sep. 29, 2007, 1 pg.

Turner, J., Myron Krueger Live, ctheory.net, [online] [retrieved on Nov. 19, 2013] http://www.ctheory.net/articles.aspx?id=328, Jan. 23, 2002, 8 pgs.

USPTO Notice of Allowance dated Sep. 18, 2013 issued in U.S. Appl. No. 13/786,346, filed Mar. 5, 2013.

(56) References Cited

OTHER PUBLICATIONS

USPTO Notice of Allowance dated Sep. 18, 2013 issued in U.S. Appl. No. 13/786,265, filed Mar. 5, 2013.
USPTO Notice of Allowance dated Dec. 6, 2013 issued in U.S. Appl. No. 13/731,946, filed Dec. 31, 2012.
USPTO Notice of Allowance dated Dec. 26, 2013 issued in U.S. Appl. No. 13/549,285, filed Jul. 13, 2012.
USPTO Notice of Allowance dated Feb. 10, 2014 issued in U.S. Appl. No. 13/180,512, filed Jul. 11, 2011.
USPTO Notice of Allowance dated Sep. 6, 2013 issued in U.S. Appl. No. 12/541,948, filed Aug. 15, 2009.
USPTO Notice of Allowance dated Dec. 19, 2013 issued in U.S. Appl. No. 11/761,978, filed Jun. 12, 2007.
USPTO Notice of Allowance dated Jun. 20, 2014 issued in U.S. Appl. No. 14/141,297, filed Dec. 26, 2013.
Holz, C., et al., Fiberio: A Touchscreen that Senses Fingerprints, Proceedings of the 26th Annual ACM Symposium on User Interface Software and Technology (UIST '13), Oct. 8-11, 2013, 5 pgs. [Jun. 11, 2014] [online] URL: http://www.christianholz.net/fiberio.html.
Marks, P., Biometric Touchscreen Recognises Prints for First Time, New Scientist, Jul. 17, 2013, Issue 2926, 3 pgs. [online] [retrieved Jun. 11, 2013] URL: http://www.newscientist.com/article/mg21929266.300?full=true&print=true#.U5n1uBA9WHN.
Moog, R. A., The Human Finger-A Versatile Electronic Music Instrument Component, Audio Engineering Society Preprint, 1977, New York, NY, 4 pgs.
Johnson, C., Image sensor tracks moving objects in hardware, Electronic Engineering Times, Apr. 5, 1999, 1 pg.
Kaoss pad dynamic effect/controller, Korg Proview Users' magazine Summer 1999, 2 pgs.
Leiberman, D., Touch screens extend grasp Into consumer realm, Electronic Engineering Times, Feb. 8, 1999.
Lim, et al., A Fast Algorithm for Labelling Connected Components in Image Arrays, Technical Report Series, No. NA86-2, Thinking Machines Corp., 1986 (rev. 1987), Cambridge, Mass., USA, 17 pgs.
Pennywitt, K., Robotic Tactile Sensing, Byte, Jan. 1986, 14 pgs.
Review of KORG X-230 Drum (later called "Wave Drum"), Electronic Musician, Apr. 1994, 1 pg.
Rich, R., Buchla Lightning MIDI Controller, Electronic Musician, Oct. 1991, 5 pgs.
Rich, R., Buchla Thunder, Electronic Musician, Aug. 1990, 4 pgs.
Dario P., et al., Tactile sensors and the gripping challenge, IEEE Spectrum, vol. 5, No. 22, Aug. 1985, pp. 46-52.
Snell, J. M., Sensors for Playing Computer Music with Expression, Proceedings of the Intl. Computer Music Conf. at Eastman, 1983, pp. 113-126.
Verner J., Artif Starr Switch Company Ztar 624-D, Electronic Musician, Nov. 1994, 5 pgs.
Haken, L., An Indiscrete Music Keyboard, Computer Music Journal, Spring 1998, pp. 30-48.
USPTO Notice of Allowance dated May 8, 2013 issued in U.S. Appl. No. 12/541,948, filed Aug. 15, 2009.
Buxton, W. A. S., Two-Handed Document Navigation, Xerox Disclosure Journal, 19(2), Mar./Apr. 1994 [online] URL: http://www.billbuxton.com/2Hnavigation.html, pp. 103-108.
USPTO Notice of Allowance dated Mar. 20, 2012 issued in U.S. Appl. No. 12/724,413, filed Mar. 15, 2010.
USPTO Notice of Allowance dated Jan. 10, 2008 issued in U.S. Appl. No. 10/683,914, filed Oct. 10, 2003.
USPTO Notice of Allowance dated Nov. 9, 2012 issued in U.S. Appl. No. 12/502,230, filed Jul. 13, 2009.
USPTO Notice of Allowance dated Mar. 12, 2012 issued in U.S. Appl. No. 12/511,930, filed Jul. 29, 2009.
USPTO Notice of Allowance dated May 16, 2013 issued in U.S. Appl. No. 13/441,842, filed Apr. 7, 2012.
USPTO Notice of Allowance dated May 24, 2013 issued in U.S. Appl. No. 13/442,815, filed Apr. 9, 2012.
USPTO Notice of Allowance dated Dec. 24, 2002 issued in U.S. Appl. No. 09/812,870, filed Mar. 19, 2001.
Otsu's method, [online] [retrieved on Jun. 26, 2013] URL: http://en.wikipedia.org/wiki/Otsu_method, Sep. 13, 2010, 2 pgs.
Principal component analysis, [online] [retrieved on Jun. 26, 2013] URL: http://en.wikipedia.org/wiki/Principal_component_analysis, Feb. 25, 2011, 9 pgs.
USPTO Notice of Allowance dated May 30, 2013 issued in U.S. Appl. No. 13/442,806, filed Apr. 9, 2012.
DIY Touchscreen Analysis, MOTO, [online] [retrieved on May 12, 2013] URL: http://labs.moto.com/diy-touchscreen-analysis/, Jul. 15, 2010, 23 pgs.
Wilson, T.V., How the iPhone Works, howstuffworks, [online] [retrieved on May 12, 2013] URL: http://electronics.howstuffworks.com/iphone2.htm, Jan. 8, 2011, 11 pgs.
Walker, G., Touch and the Apple iPhone, Veritas et Visus, [online] [retrieved on May 12, 2013] URL: http://www.veritasetvisus.com/VVTP-12,%20Walker.pdf, Feb. 2007, pp. 50-54.
Han, J., Multi-Touch Sensing through LED Matrix Displays (video), [online] [retrieved on May 12, 2013] "http://cs.nyu.edu/~jhan/ledtouch/index.html," Feb. 18, 2011, 1 pg.
Roberts Cross, [online] [retrieved on May 12, 2013] URL: http://en.wikipedia.org/wiki/Roberts_Cross, Jul. 20, 2010, visited Feb. 28, 2011, 3 pgs.
Sobel Operator, [online] [retrieved on May 12, 2013] URL: http://en.wikipedia.org/wiki/Sobel_operator, Mar. 12, 2010, visited Feb. 28, 2011, 5 pgs.
Prewitt, [online] [retrieved on May 12, 2013] URL: http://en.wikipedia.org/wiki/Prewitt, Mar. 15, 2010, visited Feb. 28, 2011, 2 pgs.
Coefficient of variation, [online] [retrieved on May 12, 2013] URL: http://en.wikipedia.org/wiki/Coefficient_of_variation, Feb. 15, 2010, visited Feb. 28, 2011, 2 pgs.
Canny edge detector, [online] [retrieved on May 12, 2013] http://en.wikipedia.org/wiki/Canny_edge_detector, Mar. 5, 2010, 4 pgs.
Polynomial regression, [online] [retrieved on May 12, 2013] http://en.wikipedia.org/wiki/Polynomial_regression, Jul. 24, 2010, 4 pgs.
Pilu,M., et al., Training PDMs on models: The Case of Deformable Superellipses, Proceedings of the 7th British Machine Vision Conference, Edinburgh, Scotland, 1996, pp. 373-382, [online] [retrieved on Feb. 28, 2011] URL: https://docs.google.com/viewera=v&pid=explorer&chrome=true&srcid=0BxWzm3JBPnPmNDI1MDIxZGUtNGZhZi00NzJhLWFhZD-MtNTJmYmRiMWYyMjBh&authkey=CPeVx4wO&hl=en.
Osian, M., et. al., Fitting Superellipses to Incomplete Contours, IEEE Computer Society Conference on Computer Vision and Pattern Recognition Workshops (CVPRW '04), Jun. 2004, 8 pgs.
Hough transform, [online] [retrieved on Feb. 13, 2010] URL: http://en.wikipedia.org/wiki/Hough_transform, Feb. 13, 2010, 7 pgs.
Tactile Pressure Measurement, Pressure Mapping Systems, and Force Sensors and Measurement Systems, [online] [retrieved on Aug. 6, 2013] URL: http://www.tekscan.com, 2 pgs.
Tactile Surface Pressure and Force Sensors,Sensor Products LLC, Oct. 26, 2006, [online] [retrieved on Aug. 6, 2013] URL: http://www.sensorprod.com, 2 pgs.
Pressure Profile Systems, Jan. 29, 2011, [online] [retrieved on Jan. 29, 2011] URL: http://www.pressureprofile.com, 1 pg.
Xsensor Technology Corporation, Feb. 7, 2011, [online] [retrieved on May 12, 2013] URL: http://www.xsensor.com, 1 pg.
Balda AG, Feb. 26, 2011, [online] [retrieved on May 12, 2013] URL: http://www.balda.de, 1 pg.
Cypress Semiconductor, Feb. 28, 2011, [online] [retrieved on May 12, 2013] URL: http://www.cypress.com, 1 pg.
Synaptics, Jan. 28, 2011, [online] [retrieved on May 12, 2013] URL: http://www.synaptics.com, 1 pg.
Venolia, D., et al., T-Cube: A Fast, Self-Disclosing Pen-Based Alphabet, CHI '94 Proceedings of the SIGCHI Conference on Human Factors in Computing Systems, Apr. 24-28, 1994, pp. 265-270.
Davis, R. C., et al., NotePals: Lightweight Note Taking by the Group, for the Group, University of California, Berkeley, Computer Science Division, 1998, 8 pgs.
Rekimoto, Jun, Pick-and-Drop: A Direct Manipulation Technique for Multiple Computer Environments, Sony Computer Science Labora-

(56) References Cited

OTHER PUBLICATIONS tory Inc., Tokyo, Japan, 1997, [online] [retrieved on May 30, 2013] URL: http://www.sonycsl.co.jp/person/rekimoto/papers/uist97.pdf, 8 pgs.

Davis, R. C., et al., NotePals: Lightweight Note Sharing by the Group, for the Group, [online] [retrieved on Jun. 2, 2013] URL: http://dub.washington.edu:2007/projects/notepals/pubs/notepals-chi99-final.pdf, 9 pgs.

Want, R., et al., The PARCTAB ubiquitous computing experiment, 1995-1996, [online] [retrieved on Jun. 10, 2013] URL: http://www.ece.rutgers.edu/~parashar/Classes/02-03/ece572/perv-reading/the-parctab-ubiquitous-computing.pdf, 44 pgs.

* cited by examiner 1221          1222

TOUCH USER INTERFACE SUPPORTING GLOBAL AND CONTEXT-SPECIFIC TOUCH GESTURES THAT ARE RESPONSIVE TO AT LEAST ONE FINGER ANGLE

STATEMENT OF RELATED CASES

This application is a continuation of U.S. patent application Ser. No. 13/731,946, filed Dec. 31, 2012, which is a continuation of U.S. patent application Ser. No. 12/502,230, filed Jul. 13, 2009, now U.S. Pat. No 8,345,014, issued Jan. 1, 2013, the contents of which are incorporated by reference, which claims benefit of priority from U.S. Provisional Application 61/080,232, filed Jul. 12, 2008.

BACKGROUND OF THE INVENTION

1. Field of the Invention

This invention relates to the use of a High Dimensional Touchpad (HDTP) providing enhanced parameter capabilities to the control computer window systems, computer applications, web applications, and mobile devices, by using finger positions and motions comprising left-right, forward-back, roll, pitch, yaw, and downward pressure of one or more fingers and/or other parts of a hand in contact with the HDTP touchpad surface.

2. Advantages of the Invention

The incorporation of the system and method of the invention allows for enhanced control of at least computer window systems, computer applications, web applications, and mobile devices. The inclusion of at least one of roll, pitch, yaw, and downward pressure of the finger in contact with the touchpad allows more than two user interface parameters to be simultaneously adjusted in an interactive manner. Contact with more than one finger at a time, with other parts of the hand, and the use of gestures, grammar, and syntax further enhance these capabilities.

The invention employs an HDTP (such as that taught in issued U.S. Pat. No. 6,570,078, pending U.S. patent application Ser. Nos. 11/761,978 and 12/418,605, pending Provisional Patent Application 61/123,217, or other such technology) to provide easier control of application and window system parameters. An HDTP allows for smoother continuous and simultaneous control of many more interactive when compared to a mouse scroll wheel mouse. Tilting, rolling, or rotating a finger is easier than repeatedly clicking a mouse button through layers of menus and dialog boxes or dragging and clicking a button or a key on the keyboard. Natural metaphors simplify controls that are used to require a complicated sequence of actions.

The invention will be described in greater detail below with reference to the accompanying drawings.

BRIEF DESCRIPTION OF THE DRAWINGS

The items above and other aspects, features and advantages of the present invention will become more apparent upon consideration of the following description of preferred embodiments taken in conjunction with the accompanying drawing figures.

FIG. 13b illustrates an exemplary internet browser window displaying the definition of the highlighted word in FIG. 13a.

SUMMARY OF THE INVENTION

Figure 1A:
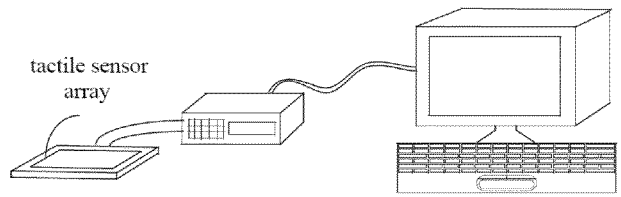
FIGS. 1a-1j illustrate exemplary arrangements and physical formats employing an HDTP touchpad. The exemplary component tactile image sensor, interface electronics, and a processor may be included collectively as components of laptop computers, mobile phones, mobile devices, remote control devices, etc.

In an embodiment, the invention includes a system and method for controlling an electronic game, the method comprising touching a touchpad with at least one finger, measuring at least one change in one angle of the position of the finger with respect to the surface of the touchpad and producing a measured-angle value, and using the measured-angle value to control the value of at least one user interface parameter of the electronic game.

In an embodiment, the invention includes a system and method for controlling a polyhedral menu, the method comprising touching a touchpad with at least one finger, measuring at least one change in one angle of the position of the finger with respect to the surface of the touchpad and producing a measured-angle value, and using the measured-angle value to control the value of at least one user interface parameter of the polyhedral menu.

In an embodiment, the invention includes a system and method for controlling a computer operating system, the method comprising touching a touchpad with at least one finger, measuring at least one change in one angle of the position of the finger with respect to the surface of the touchpad and producing a measured-angle value, and using the measured-angle value to control the value of at least one user interface parameter for controlling the computer operating system.

In an embodiment, the invention includes a system and method for controlling the observation viewpoint of a 3D map, the method comprising touching a touchpad with at least one finger, measuring at least one change in one angle of the position of the finger with respect to the surface of the touchpad and producing a measured-angle value, and using the measured-angle value to control the value of at least one user interface parameter for controlling the observation viewpoint of the 3D map.

In an embodiment, the invention includes a system and method for controlling the observation viewpoint of a surrounding photographic emersion, the method comprising touching a touchpad with at least one finger, measuring at least one change in one angle of the position of the finger with respect to the surface of the touchpad and producing a measured-angle value, and using the measured-angle value to control the value of at least one user interface parameter for controlling the observation viewpoint of the surrounding photographic emersion.

In an embodiment, the invention includes a system and method for controlling the orientation of a simulated vehicle, the method comprising touching a touchpad with at least one finger, measuring at least one change in one angle of the position of the finger with respect to the surface of the touchpad and producing a measured-angle value, and using the measured-angle value to control the value of at least one user interface parameter for controlling the orientation of a simulated vehicle.

In an embodiment, the invention includes a system and method for controlling the rotational angle of a graphical object, the method comprising touching a touchpad with at least one finger, measuring at least one change in one angle of the position of the finger with respect to the surface of the touchpad and producing a measured-angle value, and using the measured-angle value to control the value of at least one user interface parameter for controlling the rotational angle of a graphical object.

DETAILED DESCRIPTION

The present invention provides for the control of computer window systems, computer applications, and web applications utilizing a HDTP such as that taught in issued U.S. patent application Ser. No. 6,570,078, pending U.S. patent application Ser. Nos. 11/761,978 and 12/418,605, pending Provisional Patent Application 61/123,217, or other such technology. The cited patents teach an enhanced touchpad technology for use with user interfaces that capture not only left-right and forward-back positions of a finger in contact with the touchpad surface but additionally finger motions and positions comprising roll, pitch, yaw, and downward pressure of the finger in contact with the touchpad.

FIGS. 1a-1j illustrate exemplary setup physical formats employing such a HDTP system. In some embodiments, such a HDTP system comprises of a tactile sensor array, interface electronics, and at least one processor.

An exemplary tactile sensor array embodiment may comprise regular arrays of pressure-measurement, proximity-measurement, optical-measurement, or other measurement elements or cells. However, other types of sensors adapted to sense at least a tactile image, a pressure image, a proximity image, or an optical image resulting from a finger, multiple finger, and/or other hand contact with the touchpad are also provided for by the invention.

Figure 1D:
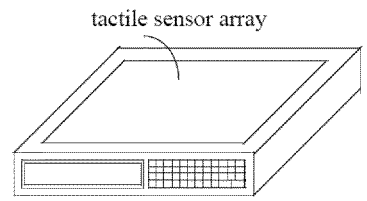
Figure 1B:
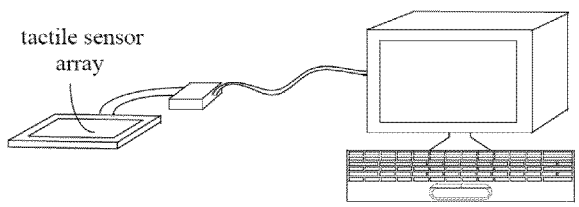
Figure 1E:
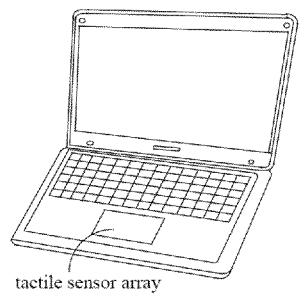
Figure 1C:
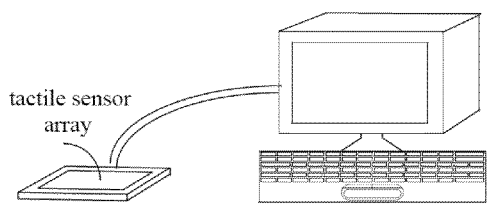
Figure 1F:
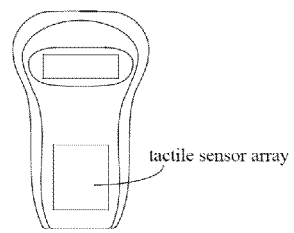
Figure 1G:
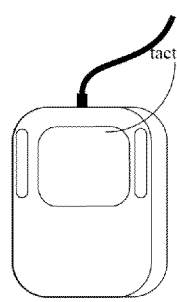
Figure 1H:
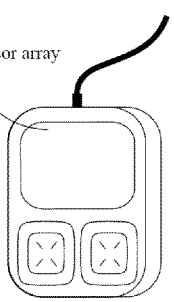
Figure 1I:
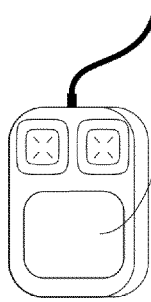
Figure 1J:
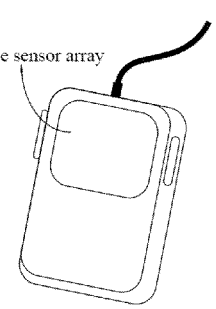

As shown in FIG. 1a, exemplary interface hardware may provide associated controls and/or visual indicators or displays. Alternatively, as illustrated in FIG. 1b, associated controls may be part of a Graphical User Interface (GUI) operating on the associated computer or on other articles of equipment. A tactile image sensor system and associated interface hardware also may be configured to share the same housing with the system or portions of it as shown in FIG. 1c. The tactile image sensor system, interface electronics, and a processor may also be configured to share a common housing environment as shown in FIG. 1d. A tactile image sensor system can be a part of mobile device as shown in FIG. 1e, and such device can be configured to work as a remote control system as shown in FIG. 1f. In an embodiment, sensor array and interface hardware may be implemented as a touchpad module within a laptop or a personal computer as shown in FIG. 1e. The tactile sensor array may be configured to be used as a touchpad element incorporated into a handheld device, such as a field measurement instrument, bench test instrument, Personal Digital Appliance (PDA), cellular phone, signature device, etc. An exemplary depiction of another exemplary handheld device, as may be used in commerce, services, or industry, is shown in FIG. 1f. A tactile image sensor system can be added to the back of a Mouse, for example as in depicted in FIGS. 1g-1j.

In an exemplary embodiment, a tactile image sensor system detects measurable tactile quantity on every cell in the tactile image sensor system as a numerical value, and interface hardware sends such numerical data to the processor where the data are processed and transformed into information describing the position and movement of a finger, multiple fingers, or other part of the hand, etc.

Figure 2A:
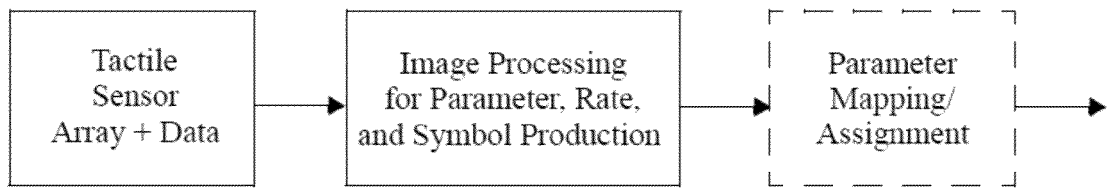
FIG. 2a depicts an exemplary realization wherein a tactile sensor array is provided with real-time or near-real-time data acquisition capabilities.

A key feature of the touchpad HDTP is its capability to process and extract values of parameters from tactile images in real-time or near real-time. FIG. 2a illustrates an exemplary dataflow embodiment. In this example, the tactile image sensor system may be periodically scanned or otherwise produce an ongoing sequence or snapshot of tactile images. In analogy with visual images, each such tactile image in the sequence (or an individual snapshot) may be called a "frame." In this example, each frame is directed to image analysis software where algorithms and/or hardware are used to calculate (or extracts) a number of parameters associated with hand contact attributes of the tactile image "frame."

Figure 2B:
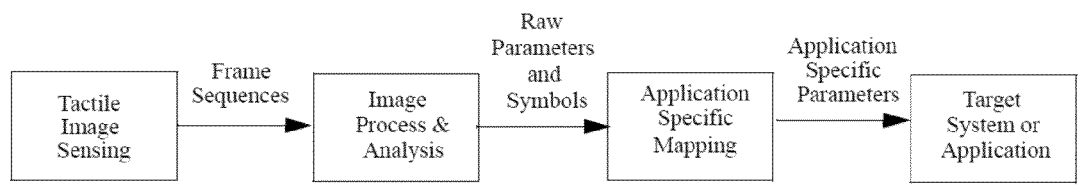
FIGS. 2b and 2c illustrate exemplary data flows in an embodiment of an HDTP system.

FIG. 2b illustrates first exemplary data flow in an embodiment of an HDTP system. Here, a Tactile Image Sensing element provides real-time tactile image data. In some embodiments, this real-time tactile image data may be advantageously organized in a pre-defined manner, for example as an ongoing sequence of "frames" similar to those comprised by motion video).

The real-time tactile image data is presented to an Image Process and Analysis element (such as those in the previously cited patents and/or those to be described later). The Image Process and Analysis element may be configured to responsively produce values or streams of values of raw parameters and symbols. In some embodiments, these raw parameters and symbols do not necessarily have any intrinsic interpretation relative to specific applications, systems, or a computer operating system. In other embodiments, the raw parameters and symbols may in-part or in-full have intrinsic interpretation. In embodiments where raw parameters and symbols do not have an intrinsic interpretation relative to applications, a system, or a computer operating system, the raw parameters may be presented to an Application Specific Mapping element. Such an Application Specific Mapping element may responsively produce Application-Specific parameters and symbols that are directed to a Target System or Application.

Figure 2C:
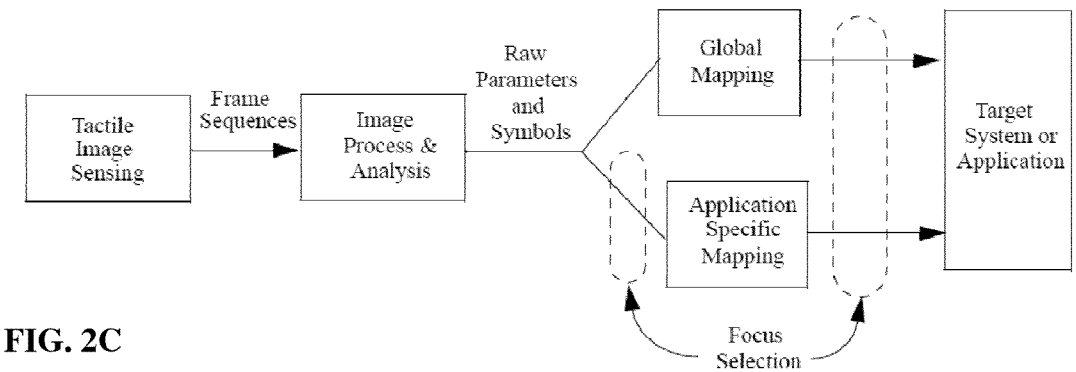
Figure 3A:
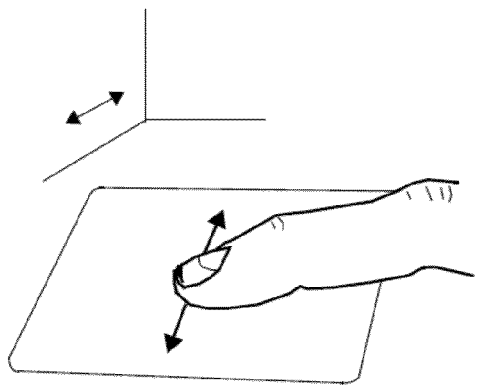
FIGS. 3A-3F illustrate how a finger can simultaneously adjust several or all of the parameters with viable degrees of independent control.
Figure 3B:
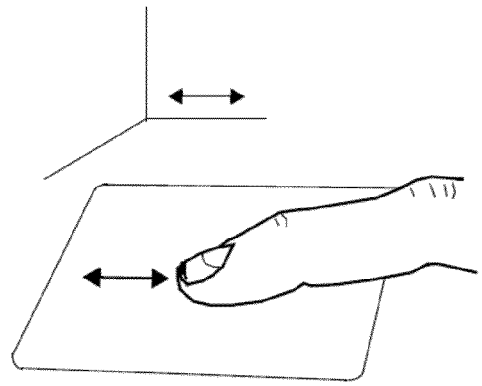
Figure 3C:
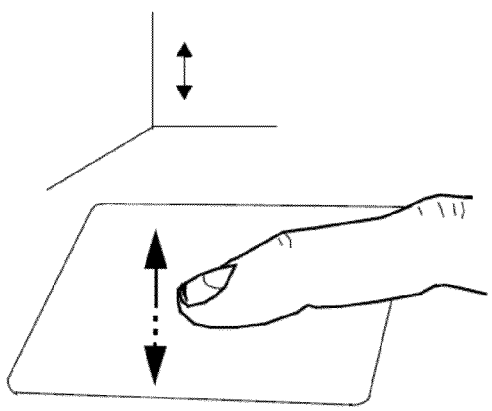
Figure 3D:
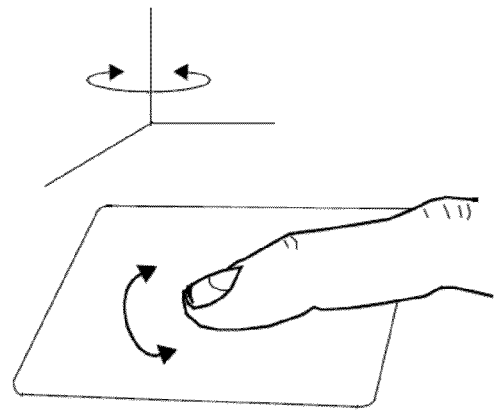
Figure 3E:
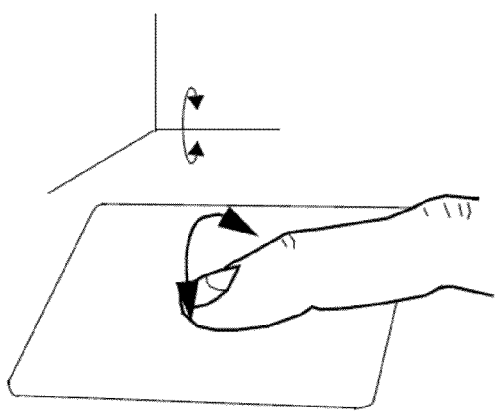
Figure 3F:
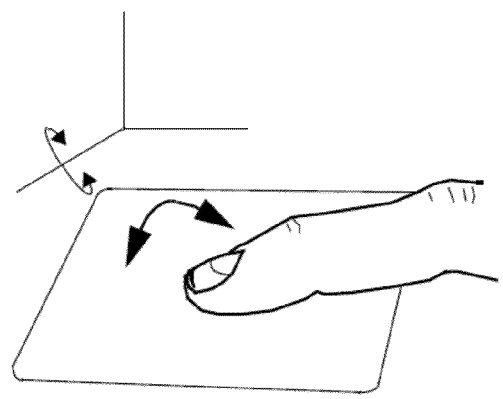

In some multi-application situations or embodiments, some raw parameters and symbols may be assigned or interpreted in a universal or globally applicable way while other raw parameters and symbols may be assigned or interpreted in an application-specific manner. FIG. 2c illustrates a second exemplary data flow in an embodiment of an HDTP system which incorporates this consideration. Here, the raw parameters and symbols may be directed to a both a Global or Universal Mapping element and an Application Specific Mapping element. The output of each of these elements is directed to a Target System or Application as directed by a focus selection element (for example, as found in a computer windowing system). The same focus selection element may also be used to simultaneously direct the raw parameters and symbols to a particular Application Specific Mapping element that is associated with the Target System or Application.

Many variations, combinations, and reorganizations of these operations and concepts are possible as is clear to one skilled in the art. Such variations, combinations, and reorganizations of these operations and concepts are provided for by the invention.

FIGS. 3a-3f illustrate six exemplary parameters that can be independently controlled by the user and subsequently recorded by algorithmic processing as provided for by invention. These six exemplary parameters are:

left-right translation (FIG. 3a), sometimes referred as "sway;"
forward-back translation (FIG. 3b), sometimes referred as "surge;"
more-less downward pressure (FIG. 3c), sometimes referred to as "heave;"
rotation (FIG. 3d), sometimes referred to as "yaw;"
left-right tilt (FIG. 3e), sometimes referred to as "roll;"
forward-back tilt (FIG. 3f), sometimes referred to as "pitch."

Figure 4:
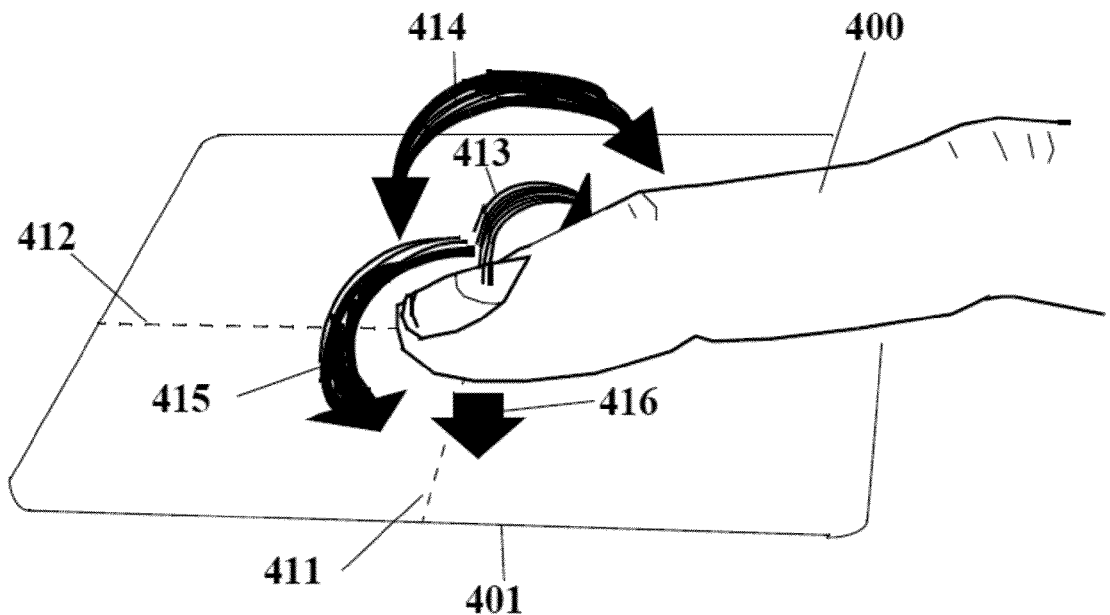
FIG. 4 illustrates exemplary six parameters that can be independently controlled by the user and subsequently recorded by algorithmic processing as provided by the invention.

These parameters may be adjusted individually, in sequence, or simultaneously. Combining these parameters allow numerous degrees of freedom. As demonstrated in FIG. 4, the finger 400 can readily interactively and simultaneously adjust several or all of the parameters simultaneously and with viable degrees of independent control.

Figure 5:
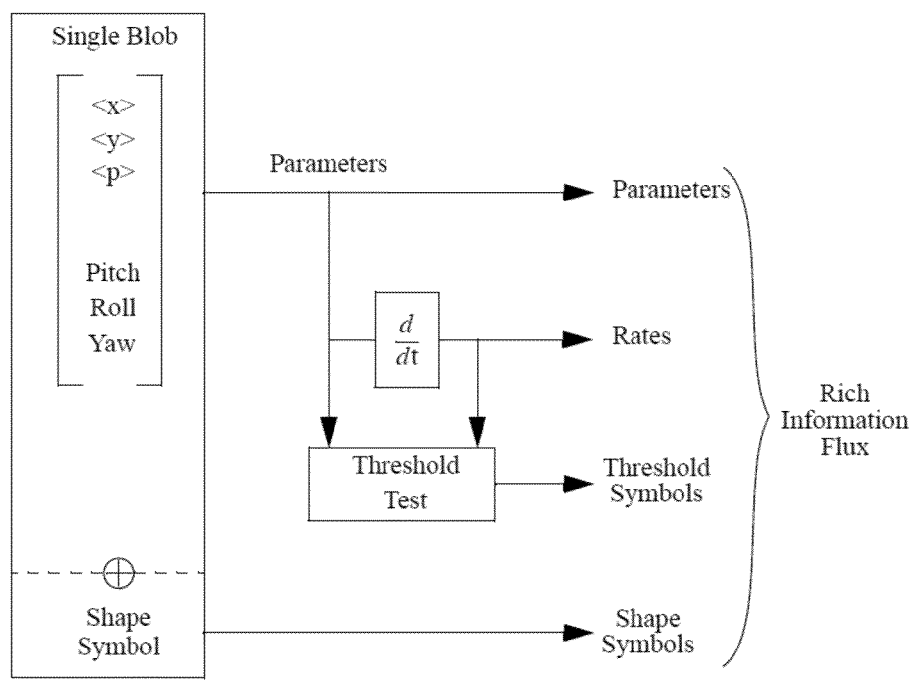
FIG. 5 illustrates an exemplary embodiment wherein parameters, rates, and symbols may be generated in response to the user's contact with a tactile sensor array, which in turn may be interpreted as parameterized postures, gestures, parameterized gestures, etc.

FIG. 5 illustrates an exemplary embodiment which can transform simple contact with (or other operative stimulus of) the sensor array into a rich information flux of parameter, rate, and symbol values. Together with the rich metaphors available with the touch interface, a tremendous range of synergistic user interface opportunities can be provided by the HDTP. The rich information flux of parameter, rate, and symbol values in turn may be interpreted as parameterized postures, gestures, parameterized gestures, etc. as may be advantageous for a system and/or applications.

Figure 6A:
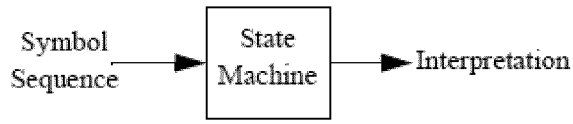
FIGS. 6a-6d depict exemplary operations acting on various parameters, rates, and symbols to produce other parameters, rates, and symbols, including operations such as sample/hold, interpretation, context, etc. , which in turn may be used to implement parameterized further details of postures, gestures, parameterized gestures, etc. and their use by systems and applications.
Figure 6B:
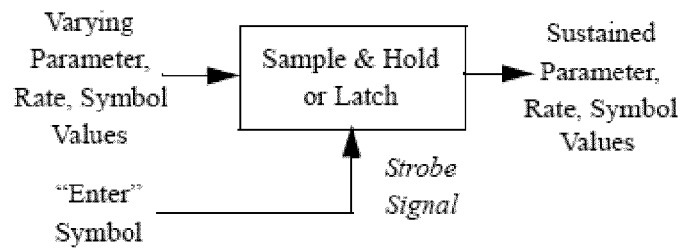
Figure 6C:
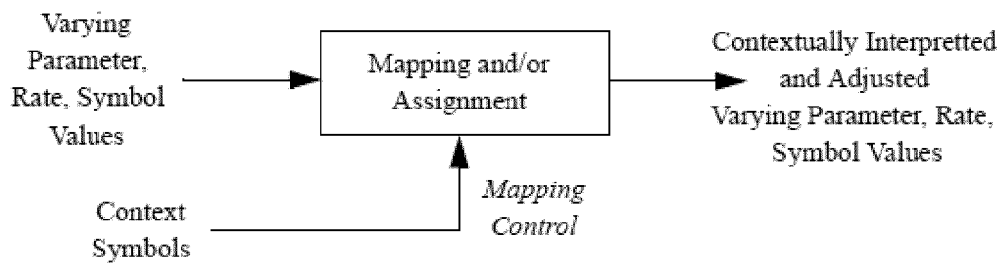
Figure 6D:
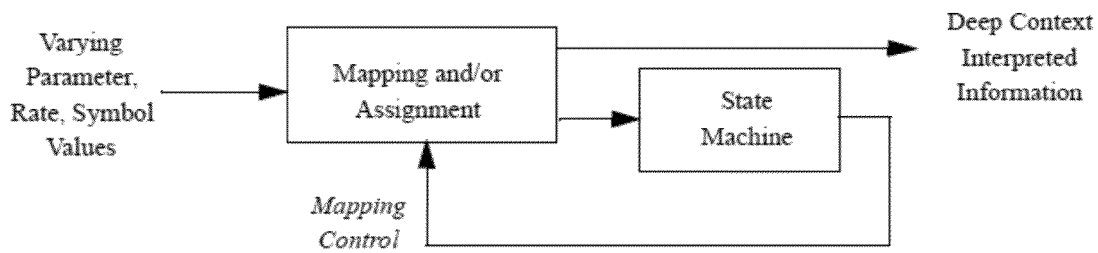

The HDTP provides for additional capabilities. For example, a sequence of symbols may be directed to a state machine, as shown in FIG. 6a, to produce other symbols that serve as interpretations of one or more possible symbol sequences. In an embodiment, one or more symbols may be designated to carry the meaning of an "Enter" key, permitting for sampling one or more varying parameter, rate, and/or symbol values and holding the value(s) until, for example, another "Enter" event, thus producing sustained values as illustrated in FIG. 6b. In an embodiment, one or more symbols may be designated as setting a context for interpretation or operation and thus control mapping and/or assignment operations on parameter, rate, and/or symbol values as shown in FIG. 6c. The operations associated with FIGS. 6a-6c may be combined to provide still further capabilities. For example, the exemplary arrangement of FIG. 6d shows mapping and/or assignment operations that feed an interpretation state machine which in turn controls mapping and/or assignment operations. In implementations where context is involved, such as in arrangements such as those depicted in FIGS. 6b-6d, the invention provides for both context-oriented and context-free production of parameter, rate, and symbol values. The parallel production of context-oriented and context-free values may be useful to drive multiple applications simultaneously, for data recording, diagnostics, user feedback, and a variety of other uses. All of these be used to implement parameterized further details of postures, gestures, parameterized gestures, etc. and their use by systems and applications.

In an embodiment, the measured parameters, derived by the tactile image data, can be either used directly or transformed into other types of control signals. The tactile image data can also be presented to shape and image recognition processing. This could be done in post-scan computation although aspects could be performed during scanning in some embodiments. In some implementations, shape and/or image recognition may be applied to interpreting the tactile image measurements. In other embodiments, shape and/or image recognition may be used to assist with or even implement tactile image measurements.

In each of the exemplary applications described below, the invention provides for any of the cited example postures and gestures to be interchanged with others as may be advantageous in an implementation.

Focus Control

In many systems, especially ones comprising multiple applications or diverse data-entry mechanisms, the information stream produced by a HDTP may need to be selectively directed to a specific application or window. In such systems, it may be useful to use some of the information produced by the HDTP for controlling which destination other information produced by the HDTP is to be directed to. As mentioned earlier in conjunction with FIG. 2c, these functions are referred to as focus control and focus selection.

Figure 6E:
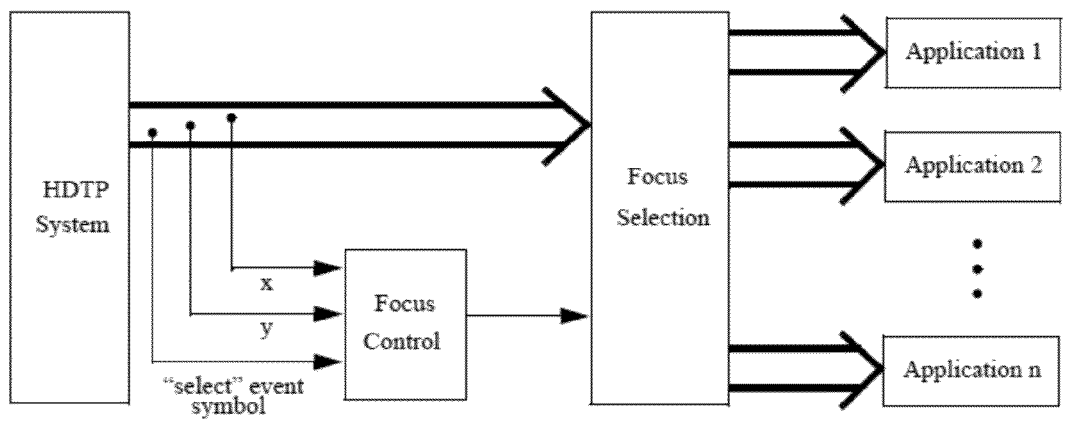
FIG. 6e shows an exemplary embodiment wherein some parameters and events are tapped and used for focus control and selection.

As an example, FIG. 6e shows an HDTP system directing an information stream (comprising for example of parameters, rates, and symbols) to a Focus Selection element under the control of Focus Control element. The Focus Control element uses a selected subset of the information stream provided by the HDTP to interpret the user's intention for the direction of focus among several windows, applications, etc. The figure shows only applications, but some of these can be replaced with application child windows, operating system, background window, etc. In this example, focus may be controlled by an {x,y} location threshold test and a "select" symbol event, although other information may be used in its place.

Gestures

A gesture refers to motion of a finger, fingers, other part of the hand, or combinations of these used to direct the system with commands. Gesture recognition facilities provided by the HDTP or subsequent or associated system may be used recognize specific changes within or between postures and resultantly invoke commands associated with a corresponding recognized gesture. In some embodiments, gestures may be recognized only on rates of change of underlying measured parameters provided by the HDTP. In some embodiments, gesture recognition may also comprise state machines driven by threshold events in measured parameters and/or rates of change of underlying measured parameters provided by the HDTP.

Temporal Delimiting of Gestures

The invention provides for the system to discern and recognize an individual gesture, or a series of gestures. In such embodiments, it may be advantageous in some embodiments to incorporate a time delay after user makes a gesture to enhance controllability. For example, if the system recognizes a gesture and execute right away, a tap followed by rotating finger would be executed as two separate events: rotate, then a single-click.

To distinguish whether a gesture is separate or part of a combined gesture, an exemplary system may detect moments in time where there is no contact on the tactile sensor array. An exemplary system may also detect moments in time where there is no appreciable changes in the tactile image captured by the tactile sensor array. In an embodiment, the system may be configured to have default or user-accustomed period of delay. In an embodiment, the system may be configured so that if another gesture continuously follows, then the gesture is determined to be part of combination of gestures. In an embodiment, the system may be configured so that a combination and/.or sequence of gestures may be viewed as another gesture. In an embodiment, the system may be configured so that a combination and/.or sequence of gestures may be viewed as a sentence of gestures. In an embodiment, the system may be configured so that a combination and/or sequence of gestures is subject to syntax and/or grammar constraints. In an embodiment, the system may be configured so that if the gesture is followed by non-contact, the gesture is determined to be independent and corresponding action is to be taken.

Global (Universal) and Context-Specific Gestures

Some of the gestures may be used as global commands; commands that are common across applications or the system. These commands include but are not limited to opening, closing, and switching between applications, opening a windows task manager, save, print, undo, redo, copy, cut, or paste (similar to commands by control key, Windows™ key, function keys, or Apple™ command key). Usually these controls are also provided by application specific menus within a specific application. Applications may assign unique gestures that are recognized only within the specific application. While the system is being used to control specific tasks within applications, it can be interrupted to control the whole system when global gestures are recognized. When a global gesture is recognized, it is executed regardless of which specific application is focused. When an application specific gesture is recognized, it will be interpreted within the application that has current focus.

In some embodiments, more complex or rarely used gestures (as opposed to simpler or more primitive gestures) may be advantageously assigned to act as global gestures. A rationale for this is that there is far less likelihood that a simple gesture would be misinterpreted as a complex gestures than a complex gestures being misinterpreted as a simpler gesture. Similarly, although sometimes three-finger posture or complex three-finger movement may be interpreted as three separate one-finger postures or gestures, an HDTP system will not confuse one-finger gesture for a three-finger gesture.

Some context commands or application specific commands can be more easily be undone than some global commands. In many embodiments, misinterpreting some global commands as context command may be less troublesome than context commands being misinterpreted as global command. Additionally, it is in many cases more complicated to undo previously executed global commands. For example, documents that are overwritten by accidental saving is hard to be retrieved; it is time consuming to re-open an application that was accidentally closed; accidental print job sent is troublesome to be stopped. Moreover, assigning more complex gestures as global, more degrees of freedom can be available for context gestures.

Exemplary Global Command Gestures

In an exemplary embodiment, a task manager can be opened by a unique gesture. For example, the user may press downward with three fingers at once, or bringing three spread fingers together. Other exemplary embodiments may include the following "Global" or "Universal" commands that can be rendered while the focus is directed to a particular application:

To open a new document, the user can drag two fingers to the right;

To close an open document, the user can drag two fingers to the left;

To save an open document, the user can roll the finger to the right, bring it to the center, and roll the finger to the left.

An undo command can be implemented by rotating a finger counter-clockwise and tapping with two other fingers;

A redo command can be implemented by rotating a finger clockwise and tapping with two other fingers.

A copy command can be implemented by pitching a finger up and tapping with another finger;

A cut command can be implemented by pitching a finger up and tapping with two other finger;

A paste command can be implemented by pitching a finger down and tapping with another finger.

A print command can be implemented by applying pressure on the HDTP with two fingers and tap with another finger Alternate assignments of various postures and gestures to such "Global" or "Universal" commands may be used as is clear to one skilled in the art.

Magnification Control

As another exemplary embodiment, a magnifying tool in text or design documents, a user can select an area to be magnified by setting horizontal and vertical area by dragging two finger diagonally across, pitch both fingers forward to view the magnified view of the selected area, and release the fingers to return to normal view.

3D-Polyhedral Menus and Pallets

The natural 3D and 6D metaphors afforded by the HDTP system provide a very natural match for the "3D-Cube" style menus, file browsers, and desktops that are appearing in contemporary and progressive operating systems. For example, one or more of roll, pitch, and yaw angles may be used to rotate 3-D objects such as cubes and other polyhedron (tetrahedrons, cubes, octahedrons, dodecahedrons, etc.). The invention provides for polyhedra to be used for menus, browsers, desktops, pallets, and other spatial-metaphor object display and selection utilities, and for these polyhedra to be manipulated by 3D and/or 6D actions invoked from the HDTP. The invention further provides for these polyhedra to be manipulated by 3D and/or 6D metaphors natural to the HDTP such as roll, pitch, yaw and also including selection through Euclidian spatial coordinates, i.e. one or more of x, y, or downward pressure (p). The invention also provides for edges and/or surfaces of the polyhedron to be distinctively visually indexed.

Operating System Interactions

Figure 7:
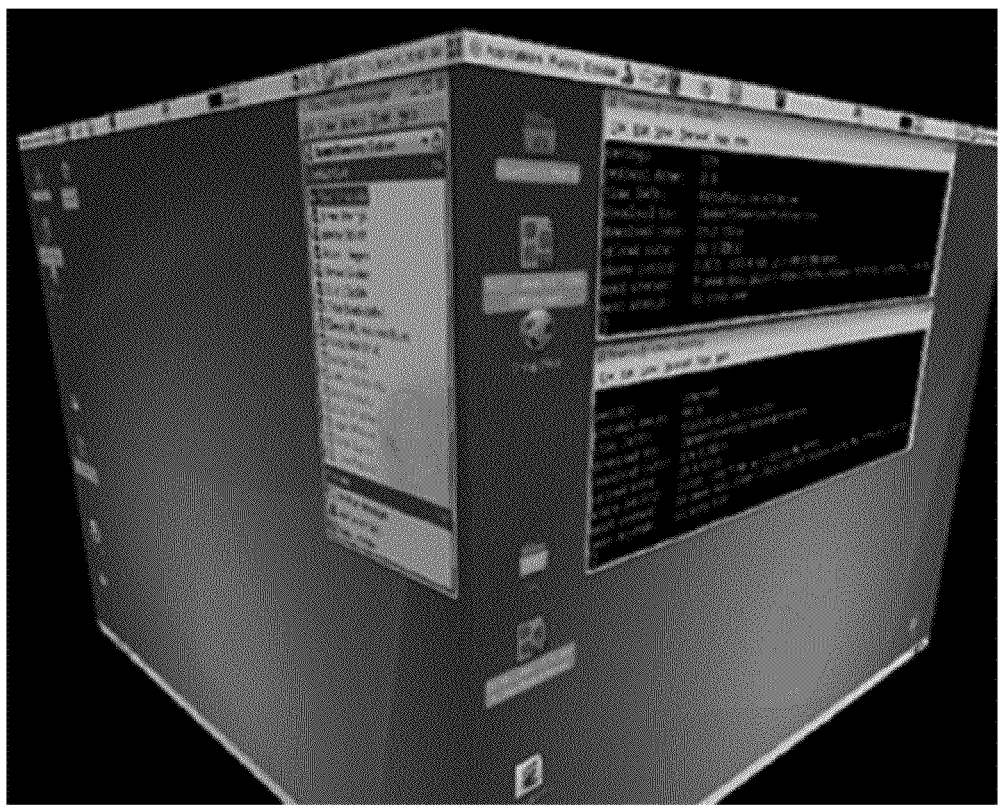
FIG. 7 illustrates an exemplary polyhedron desktop featured by some contemporary operating systems.

Many contemporary operating systems feature 3D desktop such as that as illustrated in FIG. 7 to enable users to switch between desktops easily. A 3D object, usually a cube, whose surfaces visually represent multiple desktops, is displayed. A 3D desktop allows a user to spin a transparent cube and choose any one of the desktops as the currently active one. In an exemplary embodiment, a user can roll and pitch a finger to spin the cube and choose a surface among the 3D desktop surfaces. To make a selection of desktop in this example, the user can bring up 3D desktop by tapping the touchpad with two fingers and drag to the left, roll or pitch a finger to spin the 3D desktop cube in the corresponding direction, and release the finger when the desired surface is in the front. The view is then switched to normal view with the full screen of the selected desktop.

Figure 8:
FIG. 8 illustrates an exemplary feature of some operating systems that shows a preview of each open window.

Similar to the 3D desktop feature, some operating systems displays stacked cascading windows of all open applications to enable users to switch between applications easily, such as Microsoft Windows Flip, as illustrated in FIG. 8. Such a desktop feature allows users to flip through the stack of the open windows and choose a particular application window. In an exemplary application, a user can pitch a finger to scroll through the open windows and release to choose the window that is in the front at the moment of releasing the finger. Pitching up a finger can move the cascading stack of windows in one direction, and pitching down a finger can move the cascading stack of the windows in the other direction. As an example of what is described above, while a user is working on one of the open applications, the user can bring up the Windows Flip by tapping the touchpad with two fingers and drag to the right to open the Flip window and see all the open windows of applications, pitch a finger up or down to scroll through the cascading windows of open applications, and release the finger to select the desired application window.

Figure 9:
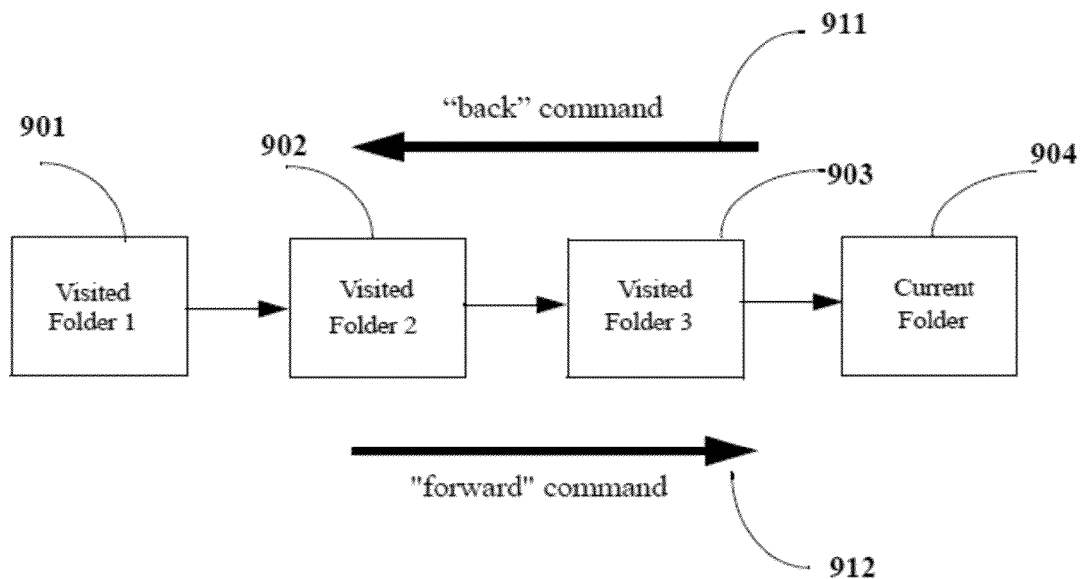
FIG. 9 illustrates an exemplary set of file folders visited by file browser and the direction of flow in the browse history.

In another exemplary embodiment, a browser window displaying thumbnail, tiles, or icons view, a user can navigate and choose a thumbnail, tile, or icon by tilting the finger left, right, up, or down to move the selection in a corresponding direction. For example, user can open a browser window of default location or home directory (usually My Computer in Microsoft Window operating system) by tapping the touchpad with two fingers and drag upward. As mentioned in an earlier section, rarely used gestures or gestures with more complexity are selected as global gestures as misinterpretation of global commands can be more troublesome than that misinterpretation of context or application command. Thus, two fingers instead of one are used here and dragging fingers upward is a natural metaphor for moving up in the hierarchy. Tilting two fingers up can open a folder one step up in the hierarchy of current open folder and tilting two fingers downward can open a folder one step down in the hierarchy of current open folder. Another example is to roll two fingers to the left to go back to a folder previously visited or to roll two fingers to the right to move to the "forward" folder. FIG. 9 illustrates how the file browser browses through the history of visited folders. Elements 901-904 represent the folders visited including the current open folder 904, 911 represents the direction the browser will navigate the history when the user rolls two fingers to the left to move back to the folder previously visited, and 912 represents the direction the browser will navigate the history when the user rolls two fingers to the right to move forward in the history. For example, if the user rolls two fingers to the left to go back to a folder previously visited while the file browser is displaying contents of the folder 904, the browser will display the folder 903. Afterwards, if the user rolls two fingers to the right to go forward in the history while the browser is displaying the contents of folder 903, the file browser will display the contents of folder 904.

Figure 10A:
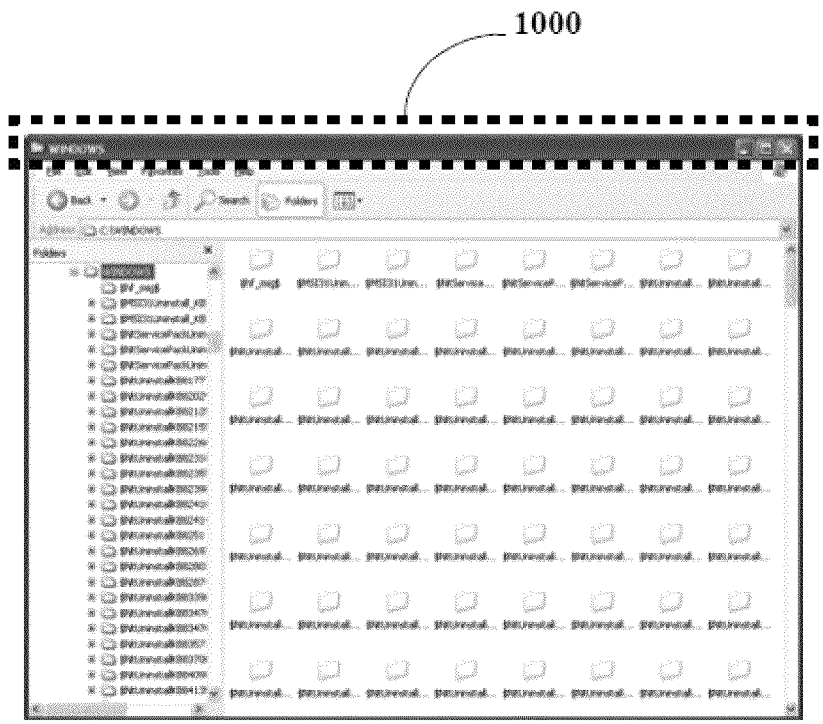
FIGS. 10a-10d depict exemplary file browser windows whose dimension is controlled by interpreted gestures of a user.
Figure 10B:
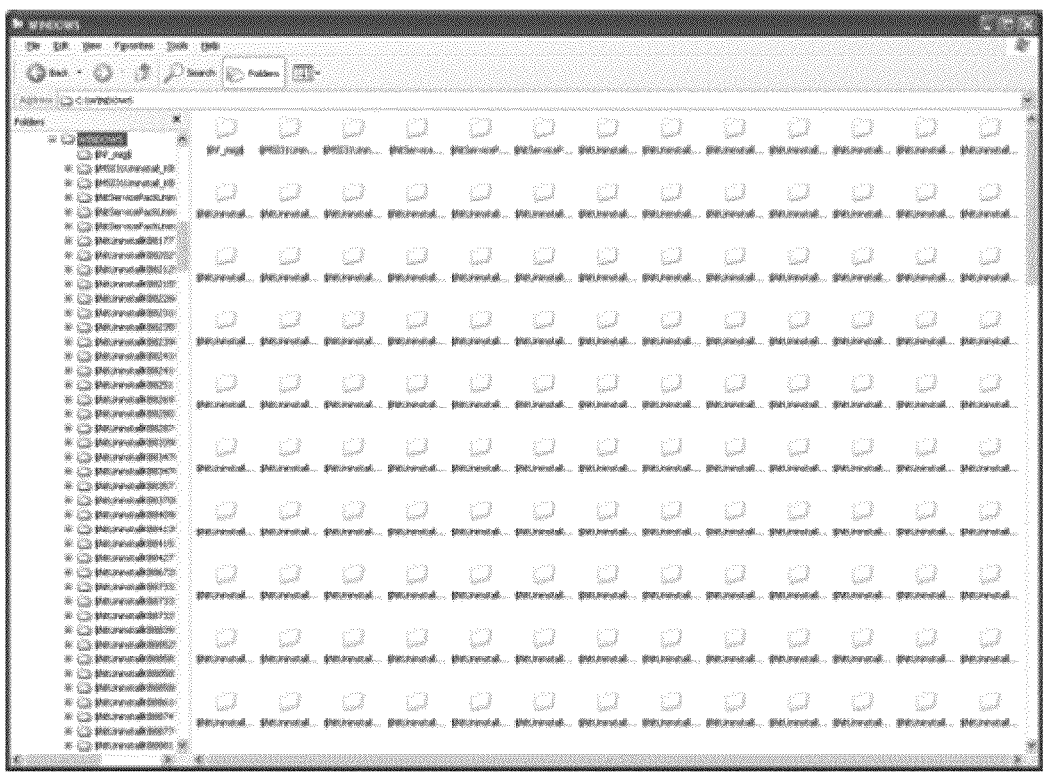
Figure 10C:
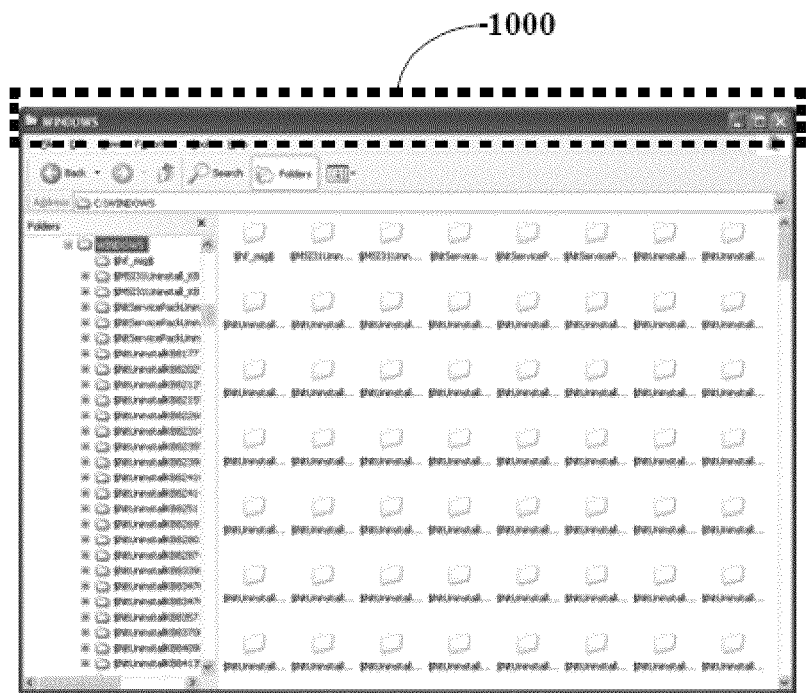
Figure 10D:
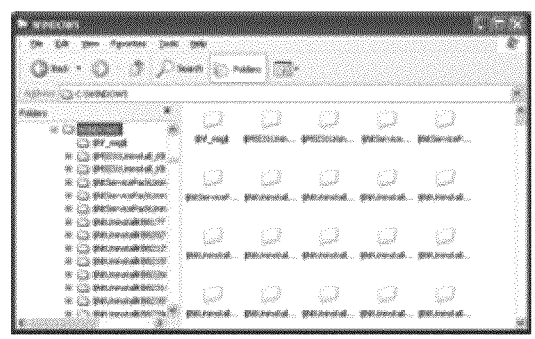

In another exemplary embodiment, placing the cursor anywhere on the title bar of any floating file browser window and rotating a finger clockwise can increase the size of the window. FIG. 10b illustrates an exemplary window with increased size as compared to the window illustrated by FIG. 10a. Placing the cursor anywhere on the title bar 1000 of any floating file browser window and rotating a finger counter-clockwise can decrease the size of the window. FIG. 10d illustrates an exemplary window with decreased dimensions relative to the window illustrated by FIG. 10c.

Figure 11A:
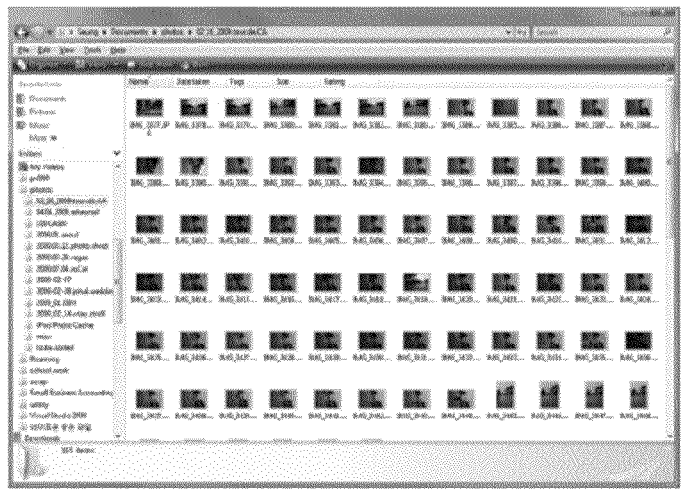
FIGS. 11a-11c illustrate exemplary file browser windows, comprising various sizes of icons, which can be controlled by interpreted gestures made by a user.
Figure 11B:
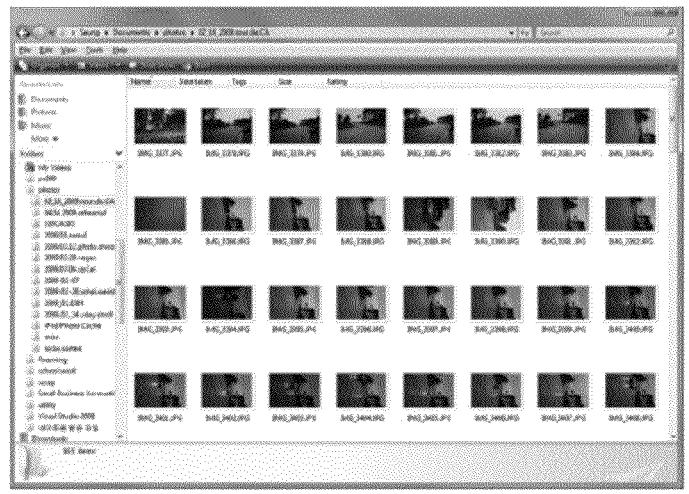
Figure 11C:
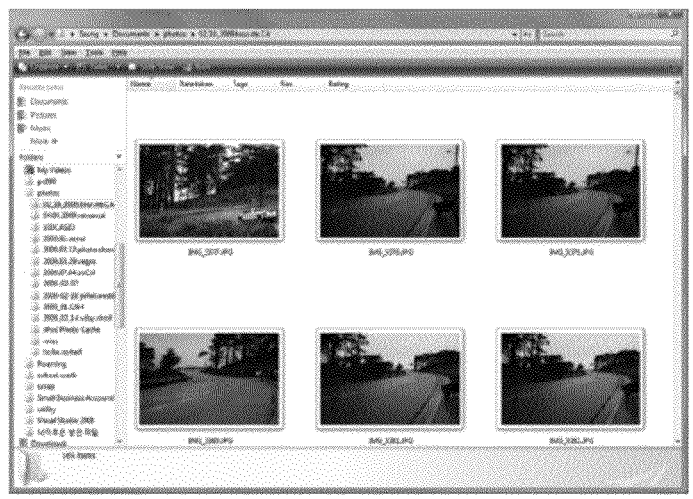

In another exemplary embodiment, placing the cursor on empty region of any window and rotating a finger clockwise can be used to increase the size of the thumbnails, tiles, or icons. Similarly, placing the cursor on empty space of any window and rotating a finger counter-clockwise can decrease the size of the thumbnails, tiles, or icons. FIG. 11a illustrates a file browser window with icons that are smaller in size relative to the icons in FIG. 11b, and FIG. 11c illustrates a file browser window with icons that are larger in size relative to the icons in FIG. 11b. Placing the cursor on any task bar items and rotating two fingers clockwise can maximize the application window, and placing the cursor on anywhere on the title bar of any application window and rotating two fingers counter-clockwise can minimize the application window. Rotating a finger clockwise and using another finger to tap can be implemented to do the same task as the right click on a mouse. For example, a user can rotate a finger clockwise to open the "right-click" menu, move a finger up or down to scroll through the items in the menu appeared once the menu appears, and tap the finger to select an item from the menu.

Tilting a finger while the cursor is placed on a start menu can be programmed to open the start menu. When the start menu is open, the user can use a finger to move up or down to scroll through items on the menu and tap to execute the selected item. As another exemplary application, when a multiple tab feature becomes available in file browser windows, similar to internet browsers' multiple tab feature, opening a new tab in the file browser can be implemented by a clockwise rotation of two fingers. Similarly, closing the current tab can be implemented by a counter-clockwise rotation of two fingers.

Internet Browser

Figure 12A:
FIGS. 12a-12d illustrate exemplary internet browser windows.
Figure 12B:
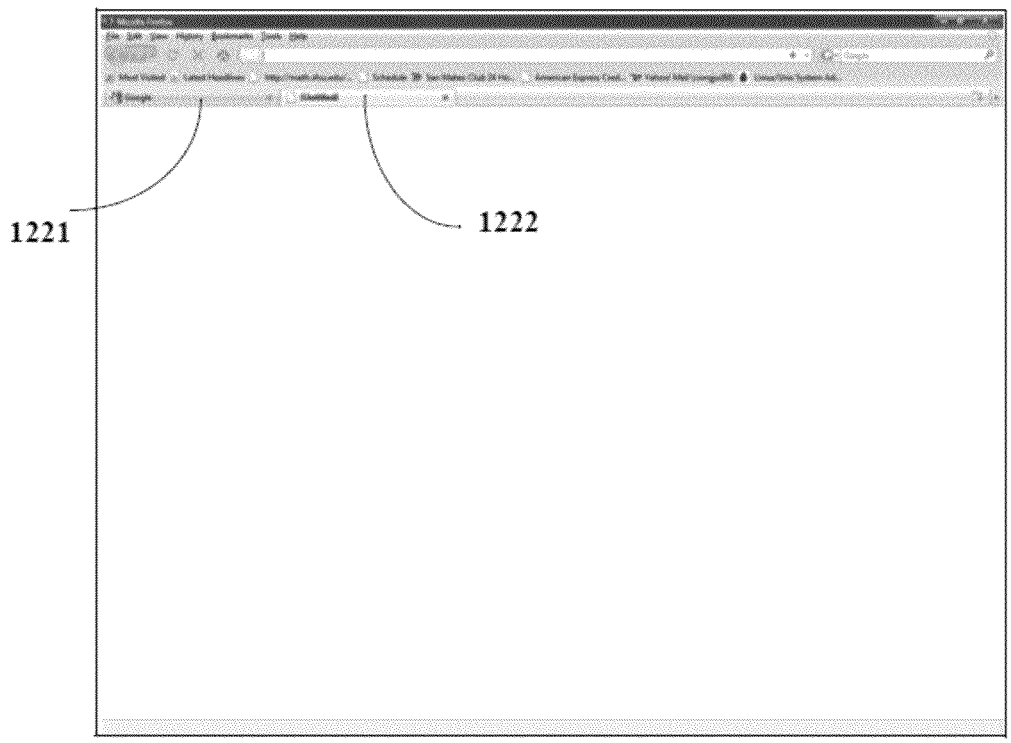
Figure 12C:
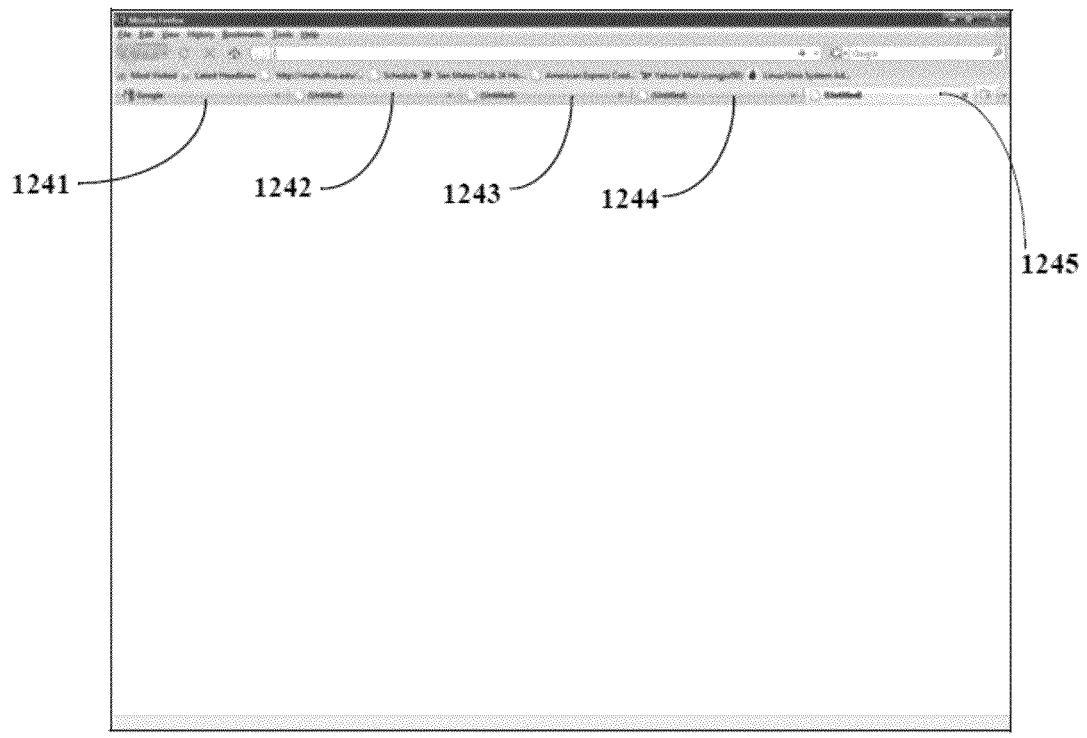
Figure 12D:
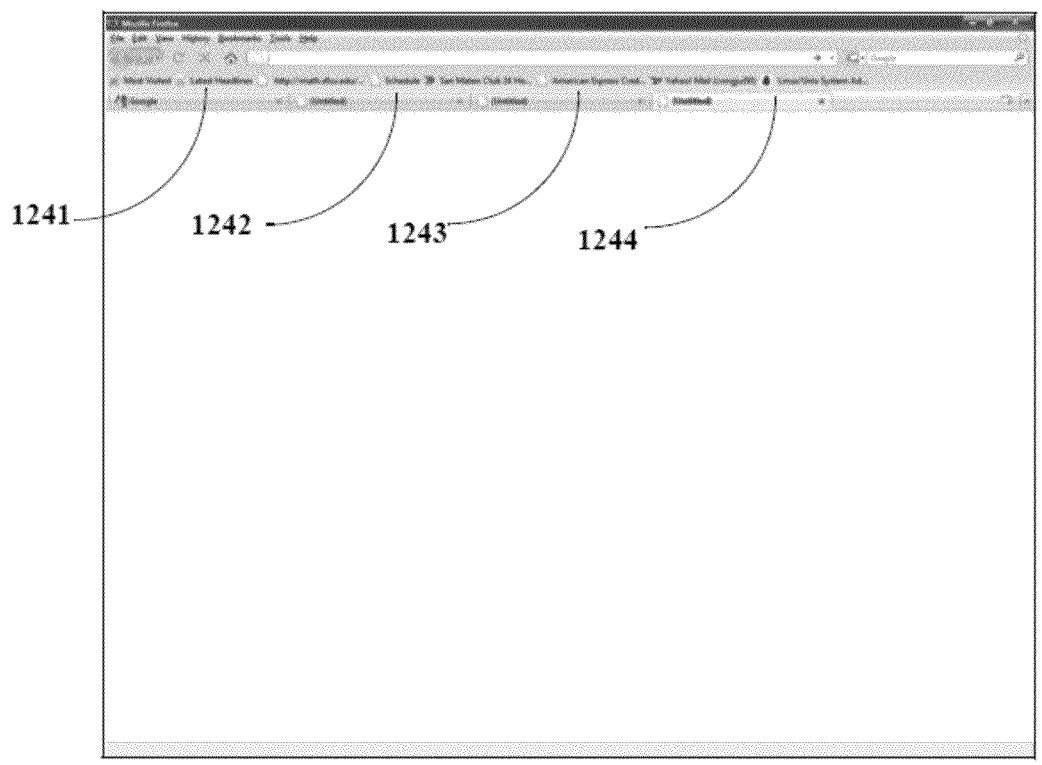
Figure 13A:
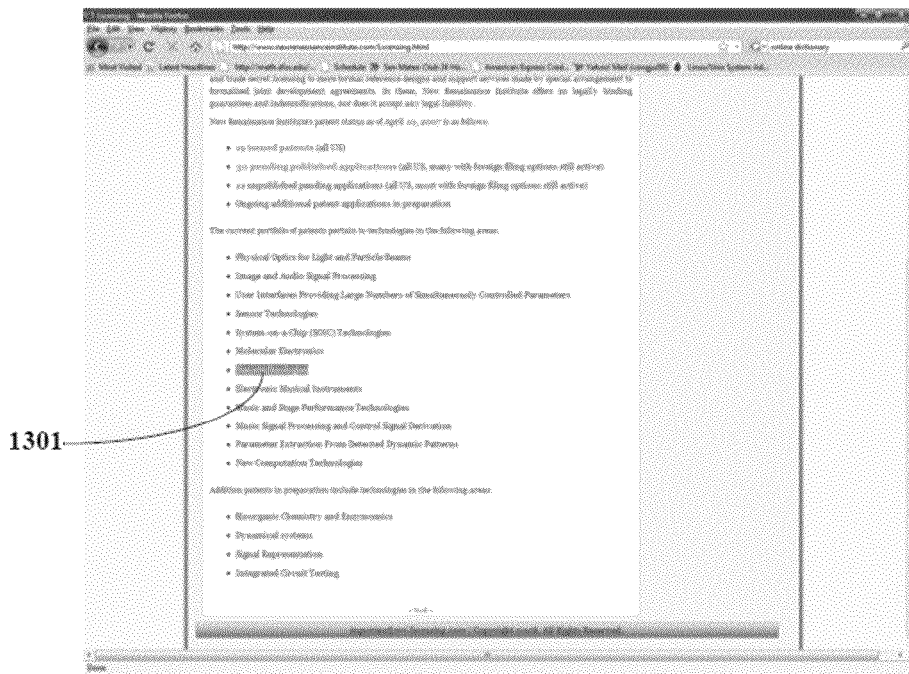
FIG. 13a illustrates an exemplary internet browser window with a word highlighted function invoked by a user.
Figure 13B:

Enhanced parameter capabilities allow faster internet browsing by enabling users for fast switching between webpages, shortcuts to open and close webpages, fast navigation of history of visited webpages, etc. Similar to multiple tab file browser window, a user can rotate a finger clockwise and use another finger to tap to open a new tab 1222 for browsing. FIG. 12*b* illustrates an exemplary internet browser window with an additional tap 1222 with initial tab 1221 open. While multiple tabs 1241-1245 are open, a user can rotate the finger counter-clockwise and use another finger to tap to close the tab 1245 that currently has focus in. FIG. 12*d* illustrates tabs 1241-1244 remaining after the tab 1245 is closed. In FIG. 13*a* and FIG. 13*b*, a user can also drag a finger across a word 1301 to select the word, and roll the finger to the right and use another finger to tap to have the browser look up the definition of the word in an online dictionary website. FIG. 13*b* illustrates a new tab 1311 with the page that is displaying the definition of the word 1301 user selected.

Figure 14:
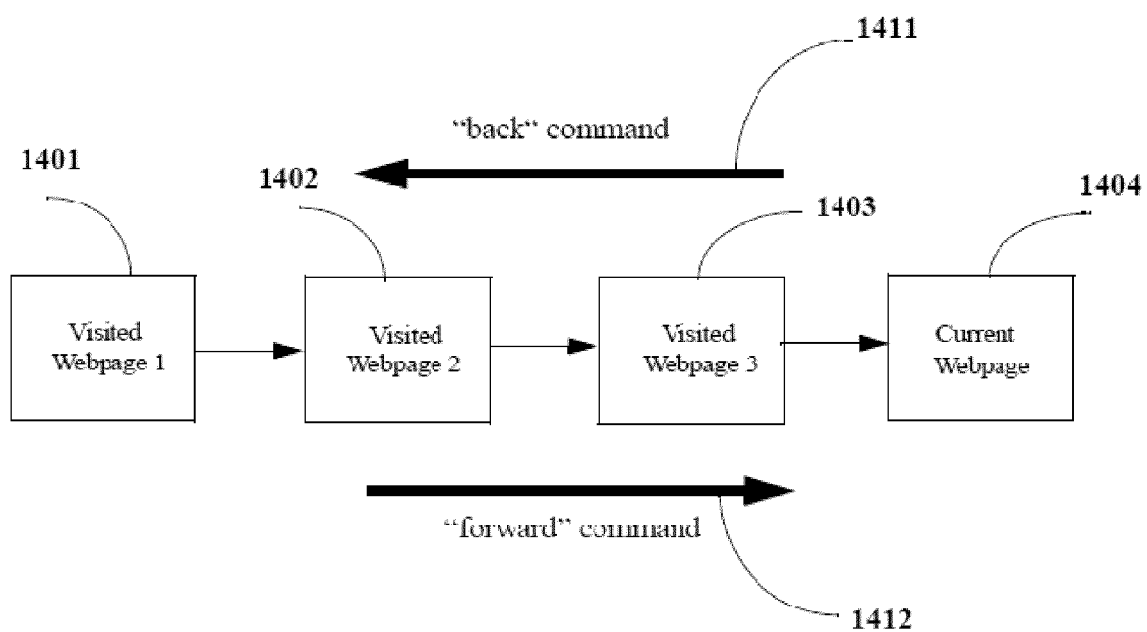
FIG. 14 illustrates an exemplary set of previously visited webpages and the direction of flow in the browsing history.
Figure 15A:
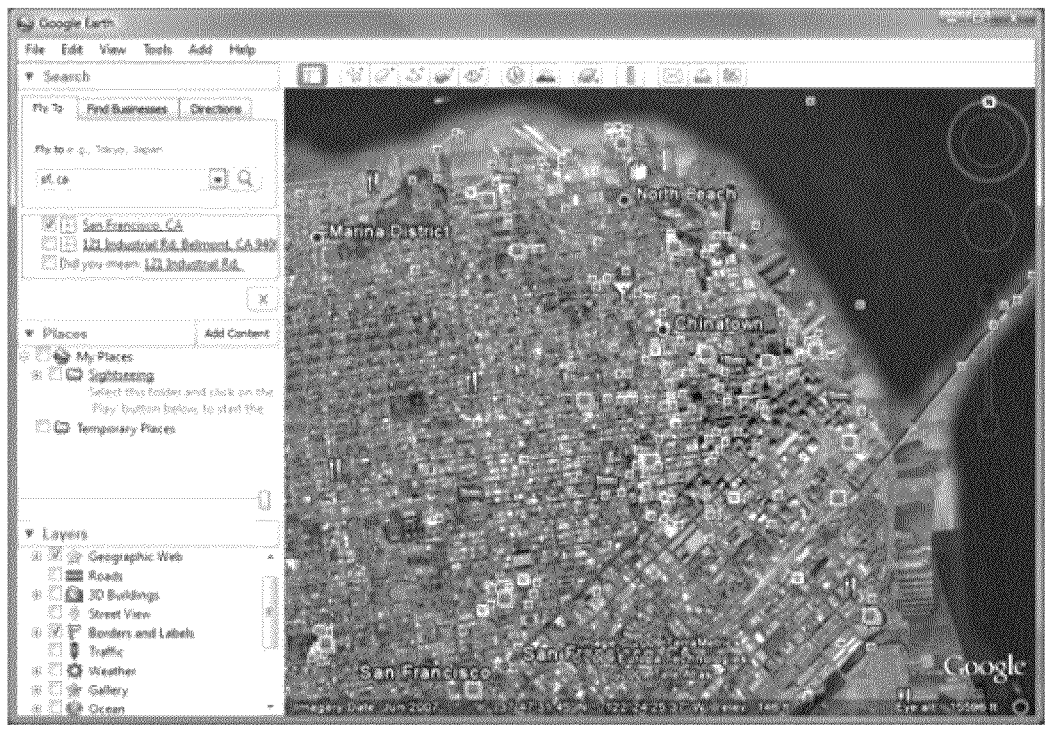
FIG. 15a illustrates an exemplary initial screen view of a geographic information program.
Figure 15B:
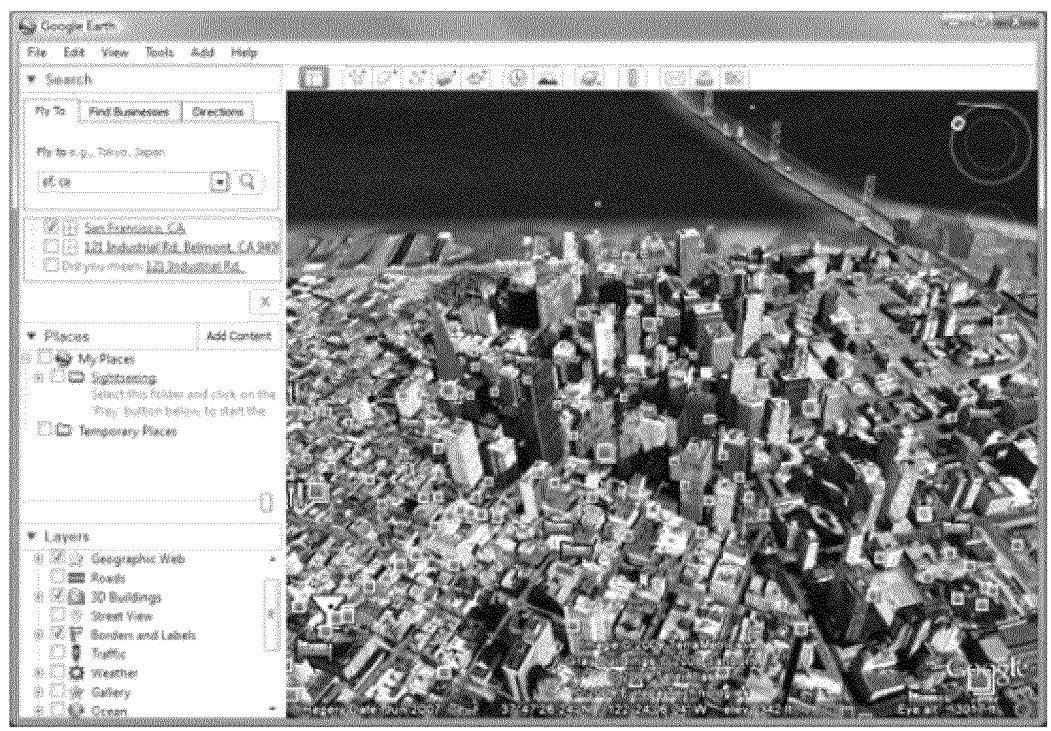
FIG. 15b illustrates an exemplary screen view with adjusted observation point.
Figure 16A:
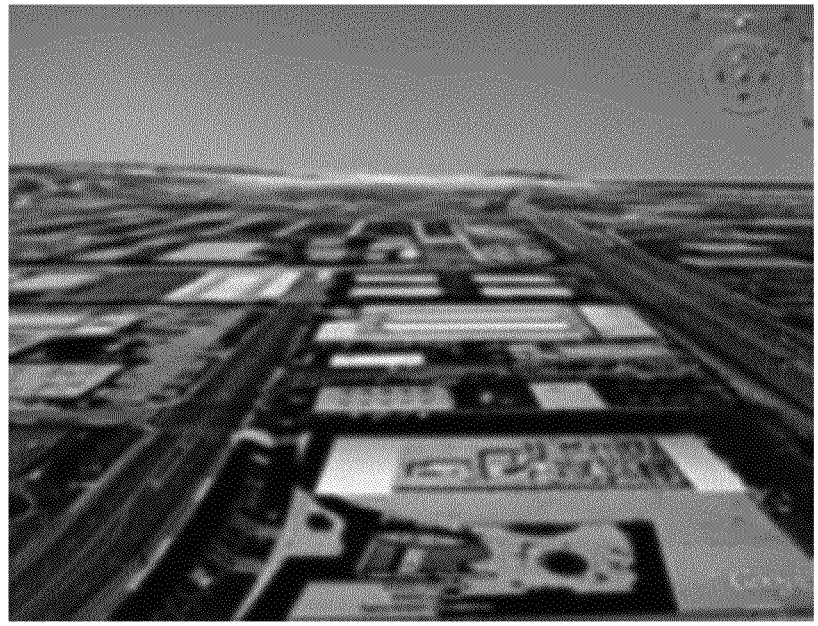
FIGS. 16a and 16b illustrate exemplary screen views of geographic information system with varied vertical observation points.
Figure 16B:

Another example is to roll the finger to the left while dragging the same finger to the left to go back to a webpage previously visited or to roll a finger to the right while dragging the same finger to the right to move to the "forward" page. FIG. 14 illustrates how the navigator browses through the history of visited webpages. 1401-1404 represent the webpages visited including the current page 1404, 1411 represents the direction the browser will navigate the history when the user rolls the finger to the left while dragging the same finger to the left to go back to a webpage previously visited, and 1412 represents the direction the browser will navigate the history when the user rolls the finger to the right while dragging the same finger to the right to go forward in the history. For example, if the user rolls the finger to the left while dragging the same finger to the left to go back to a webpage previously visited while the browser is displaying the webpage 1404, the browser will display the webpage 1403. Afterwards, if the user rolls the finger to the right while dragging the same finger to the right to go forward in the history while the browser is displaying the webpage 1403, the browser will display the webpage 1404. As another exemplary embodiment, user can shift the focus among open tabs in a browser by rotating a finger. When there are multiple open tabs in a browser, the user can rotate a finger while the cursor is placed on one of the open tabs to scroll through the tabs and select a tab to be displayed in the browser.

Navigation Applications

Figure 17A:
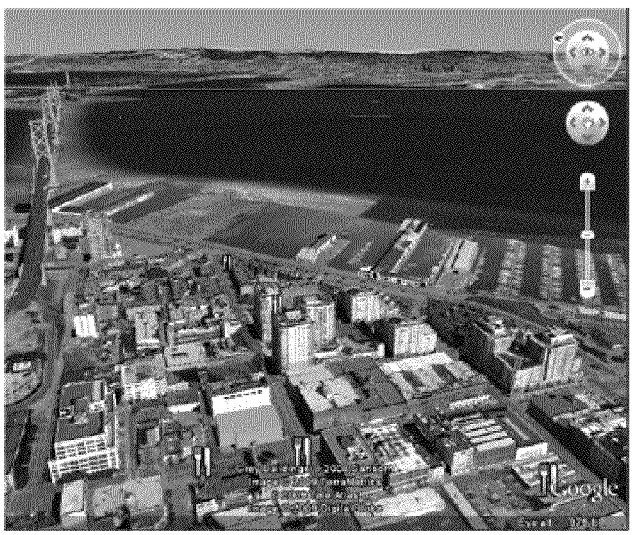
FIGS. 17a-17c illustrate exemplary screen views of geographic information system with varied horizontal observation points.
Figure 17B:
Figure 17C:
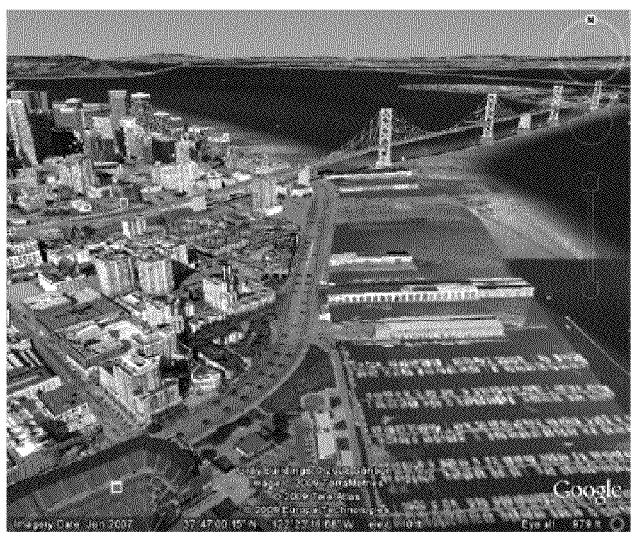

In geographic information system that maps land by superimposition of images, there are separate controls for switching observation point such as zooming, panning, horizontal direction, or vertical direction. These controls can be combined into simple and easy motions, and having natural metaphors as control avoids conflicts among integrated applications. In an exemplary application, a user can pan or drag the map to the left or right, up, or down by dragging a finger on the touchpad in the corresponding direction. For example, when a user places a finger on the map and drag the finger to the left, the area of the map showing will be shifted to the right, so more of the right side of the map will show. Also, a user may pitch a finger up or down to shift the viewpoint up or down. For example, as the user pitches the finger up, what the user sees will be as if the user was looking at the geographical image from higher up. A user can also pitch two fingers up or down to zoom in on a map or zoom out. For example, when the user pitch two fingers up to zoom in on a map, the application will show closer view of the horizon or objects, and when the user pitch two fingers down to zoom out, the application will show broader areas. Rotating a finger clockwise or counter-clockwise can rotate the view point or change the direction of the view left or right. FIG. 17*a*-17*c* illustrate exemplary views varying the horizontal direction of the observation point. Rotating a finger clockwise to rotate the view point to the left will generate view as if the user turned to the right, and rotating a finger counter-clockwise to rotate the view point to the right will generate view as if the user turned to the left.

These controls can be combined to control more than one thing at a time. There are several possibilities; for example, when a user is pitching a finger up as the user is rotating the finger counter-clockwise, the direction of the view will be rotated to the left as the viewpoint is raised. When the user is pitching a finger downward as the user rotates a finger clockwise, the view point is rotated to the right as the view point is being lowered. This opens vast new possibilities for controls in gaming, which will be discussed in a later section.

Web Mapping Service Applications

In web mapping service applications, similar controls can be implemented. Since most web mapping service applications are based on ground level, vertical shifting of the observation point may not be available, but all other controls can be implemented in the same manner. A user can pan or drag the map by dragging on the touchpad in the desired directions, zoom in or out of the area of the map by pitching two fingers upward or downward, or switch the direction of the view by rotating a finger clockwise or counter-clockwise.

Figure 18A:
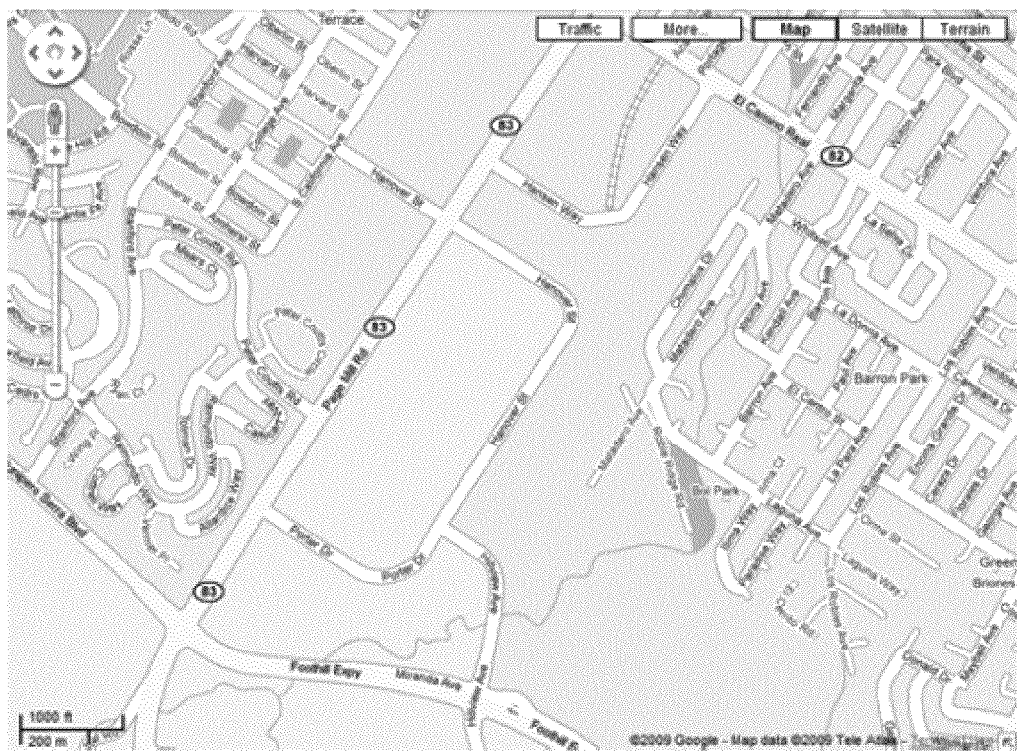
FIG. 18a illustrates an exemplary screen view of a web mapping service application.
Figure 18B:
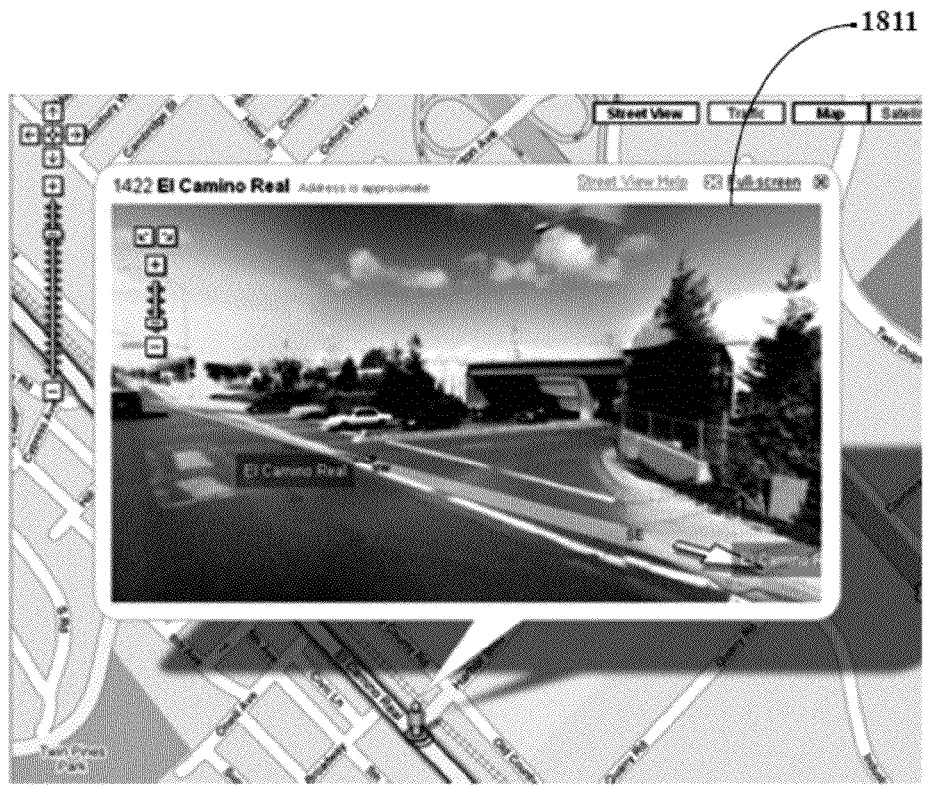
FIG. 18b illustrates an exemplary screen view of a web mapping service application with a feature that displays panoramic views from a position on the map.
Figure 18C:
FIGS. 18c-18e illustrate an exemplary screen views of a web mapping service application with a feature that displays panoramic views along the street.
Figure 18D:
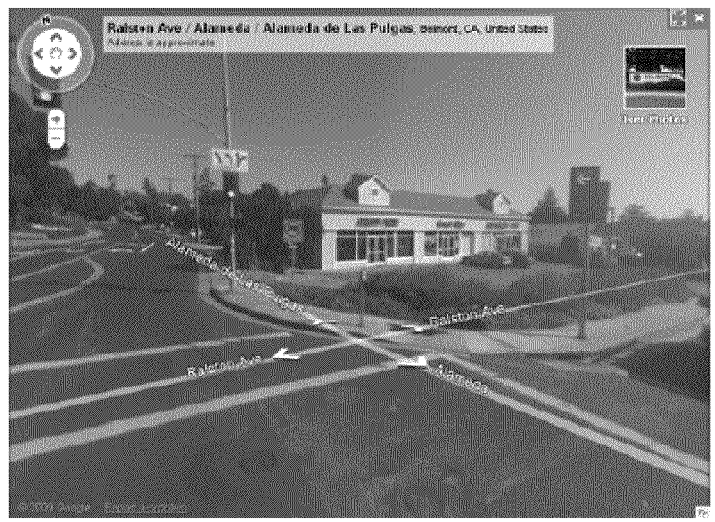
Figure 18E:
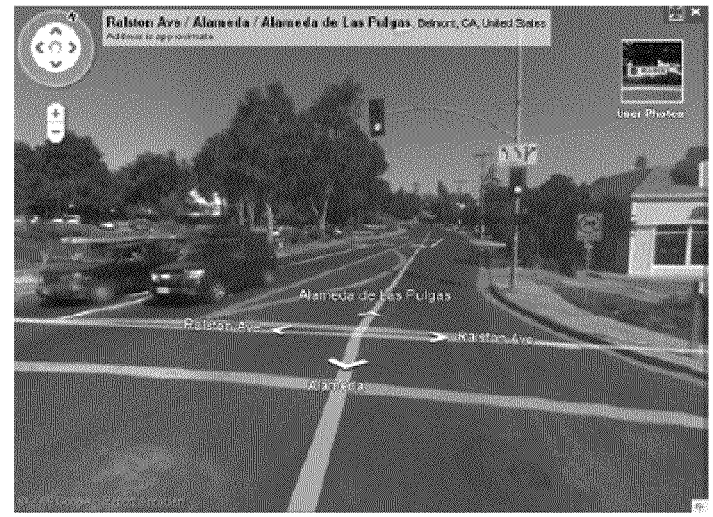

In geographic information systems or web mapping service applications with a feature that displays panoramic surrounding photographic emersion views from a street perspective, such as Google Street View, similar controls can be implemented. The user can move the observation point along the streets on the map or the image of the area by dragging a finger in the direction of desired movement, and the user can switch the direction of the view by rotating a finger clockwise or counter-clockwise. For a more detailed example, when a user moves a finger upward, the application will generate views as if the user is walking forward, and when the user rotates the finger counter-clockwise, the application will generate views as if the user turned to the left or to the west. FIG. 18*b* illustrates an exemplary screen view of a web mapping service application with a feature that displays panoramic views along the street in a window 1811. FIG. 18*d* illustrates the screen view of initial position. FIG. 18*c* illustrates an exemplary screen view of when the user rotates a finger to switch the view towards to the west, and FIG. 18*e* illustrates an exemplary screen view of when the user rotates a finger clockwise to switch the view towards to the east. Also, when the views along the street is only displayed when the user initiates the feature, the user can enter the Street View mode by pressing one finger down and exit from the Street View mode by pressing two fingers down.

Computer and Video Games

As games heavily rely on 3D features more and more, these additional parameters provided by the HDTP can be more useful as they can produce controls using natural metaphor.

Controls that previously require complicated sequence of arrow keys and buttons can easily be implemented by combination of parameters.

Flight Simulator Game

Figure 19A:
FIGS. 19a-c illustrate exemplary screen views of a flight simulator game where the view from an aircraft is pitched upward or downward.
Figure 19B:
Figure 19C:
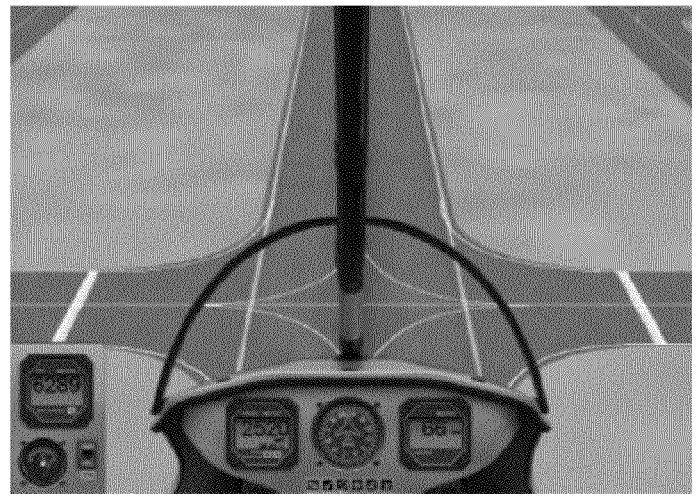
Figure 20A:
FIGS. 20a-c illustrate exemplary screen views of a flight simulator game where the vertical orientation of an aircraft is rolled counter-clockwise or clockwise.
Figure 20B:
Figure 20C:

For example, in a flight simulator game, controls that are similar to those in 3D navigation applications can be used. The user can control the direction of the movement by rolling, pitching, or rotating the finger. The user can control horizontal orientation of the aircraft by rolling the finger; roll the finger to the left to have the aircraft roll counter-clockwise and roll the finger to the right to have the aircraft roll clockwise. FIG. 20a illustrates an exemplary view from the aircraft when the aircraft is rolling to the left. The horizon 2011 appears tilted counter-clockwise relative to the horizontal orientation of the aircraft. FIG. 20b illustrates an exemplary view from the aircraft when the aircraft is not rolling. The horizon 2021 appears leveled with the horizontal orientation of the aircraft. FIG. 20c illustrates an exemplary view from the aircraft when the aircraft is rolling to the right. The horizon 2031 appears tilted clockwise relative to the horizontal orientation of the aircraft. The user can control vertical orientation (or pitch) of the aircraft by pitching the finger; pitch the finger up to pitch the aircraft upward and pitch the finger down to have the aircraft downward. For a more detailed example, an aircraft can take off as the user pitch a finger downward to have the aircraft pitch upward. FIG. 19b illustrates an exemplary screen view of the initial position of an aircraft, and FIG. 19a illustrates an exemplary view from the aircraft while headed upwards and taking off. The player can land the aircraft by pitching a finger upward to have the aircraft headed down to the ground. FIG. 19c illustrates an exemplary screen view as the aircraft approaches the ground. As the aircraft is headed up, the player can view more of objects that are farther away from the aircraft, and as the aircraft is headed down, the player can view more of objects that are closer to the aircraft. The user can control two-dimensional orientation of the aircraft at a fixed elevation by rotating the finger; rotate the finger left to have the aircraft head to the west (or to the left) and rotate the finger right to have the aircraft head to the east (or to the right). Exemplary views from the aircraft with varied horizontal rotation will be similar to the views illustrated in FIG. 17a-c. The player can also combine gestures for simultaneous multiple controls. For example the user can pitch a finger upward while rolling the finger to the left or right to control the aircraft roll to the left as the aircraft is headed down. As another example, the user can rotate a finger counter-clockwise as the aircraft is headed up to make the aircraft change its direction to the west while the elevation of the aircraft is rising.

Other Moving Vehicle Games

As another example, similar controls can be implemented in any racing games of car, motorcycle, spacecraft, or other moving objects. Pitching the finger downward can be implemented to accelerate the car; pitching the finger upward can be implemented to brake with adjusted amount of pressure; rotating the finger counter-clockwise can be implemented to turn the steering wheel to the left; rotating the finger clockwise can be implemented to turn the steering wheel to the right. As the user rotates the finger counter-clockwise to turn the car to the left and tilt the finger to the left, the car can drift.

Winter Sport Games

In skiing, snowboarding, or any first-person snow sports games, the user can rotate the finger clockwise or counter-clockwise to switch the direction; the user can roll the finger left or right to switch the center of weight of the body left or right; the user can pitch the finger forward or backward to switch the center of weight of the body to accelerate or slow down; When the skier or snowboarder hits a slight uphill or mogul, the player can jump while controlling the intensity of the jump by combination of speed and the degree of pitching the finger backward.

Summer Sport Games

In sports games where the players hit balls, such as baseball, tennis, golf, or soccer, not only the player can control the direction of hitting, the player can also control the intensity of the hits at the same time by combining rotation and pitching of the finger.

Shooter Games

Figure 21A:
FIG. 21a illustrates an exemplary screen view of a first-person shooter game.
Figure 21B:
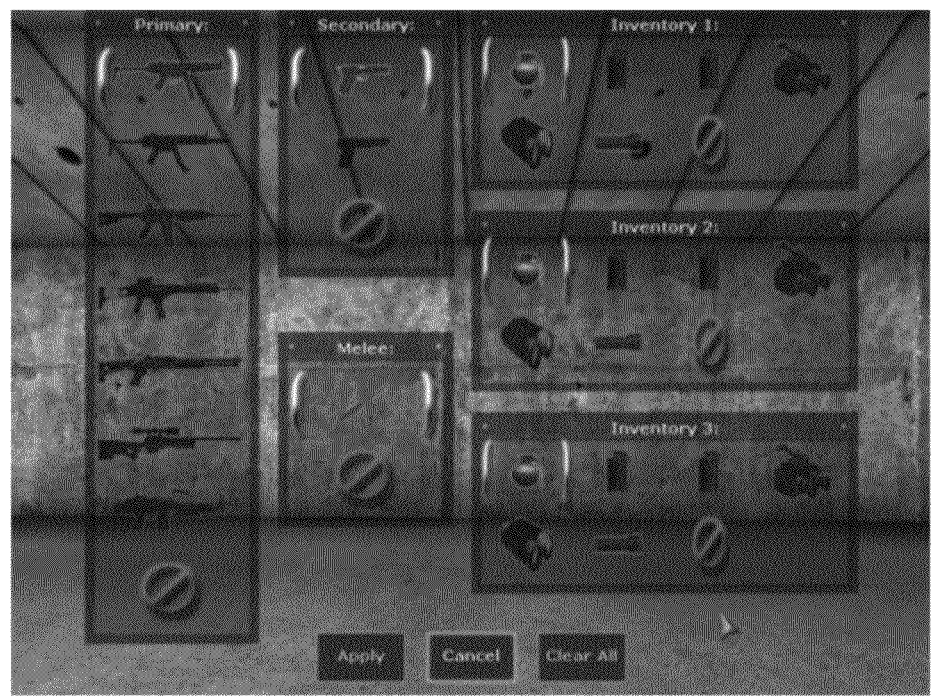
FIG. 21b illustrates an exemplary screen view of a weapon selection window of a first-person shooter game.

In first-person shooter video games, the direction of player's motion can be controlled by rotating a finger, the speed of running can be controlled by applying more or less pressure to the finger. FIG. 21a illustrates an exemplary screen view of a first-person shooter game. In addition, weapon selection window can be opened by pitching two fingers forward, and once the window is open, the player can roll the finger to scroll through the selection of weapons and release the finger to select the highlighted weapon and close the weapon selection window. FIG. 21b illustrates an exemplary screen view of a weapon selection window of a first-person shooter game. Both FIG. 21a and FIG. 21b have been obtained from video games that are available on the web for free download.

Music Performance Experience Games

In video games where players play instruments, heave and pitch of fingers can control how hard a string of an instrument is strummed or plucked or intensity of sound generated.

Media Players

In a media player, such as Winamp, Real, or Windows Media Player, increasing or reducing the volume can be implemented by pitching a finger upward or downward on the "frame." Pitching the finger on the playlist window, a user can scroll through the tracks and select the desired track to be played. A media player that features polyhedron menu of multiple play lists can be controlled similar to 3D desktop. A user can tap on the play list cube and rotate the finger left, right, up, or down to select a surface among the surfaces that represents different play lists. Rewinding or fast-forwarding can be implemented by rolling a finger left or right on the timeline, and the current track may be skipped by clockwise finger rotation and the current track may be returned to the beginning by counter-clockwise finger rotation.

Spreadsheets

Similar to selecting a thumbnail, tile, or icon in an explorer window, a user can scroll through cells on a spreadsheet by tilting the finger left, right, up, or down. A user also can tap on a cell in an initial position, drag the finger down to set vertical range of cells and drag the finger to the right to set horizontal range of selected cells. Then the user can tilt both fingers left, right, up, or down to move the group of selected cells. Selection of cells can be done differently; rolling the fingers left or right can select multiple columns incrementally, and pitching the fingers up or down can select multiple rows incrementally.

Graphic Design Applications

As computer aided design/drafting tools features numerous functionality, they have several menu items and options at different levels. Even just rotating an object or figures, there are many operations or steps involved. Instead of moving the cursor to the menu bar, clicking the drop-down menu to be opened, and moving the mouse and clicking to select the desired function, a user can use combined motion of rolling, pitching, rotating a finger that are easy to remember. For example, in some design applications such as Adobe FrameMaker™, in order for a user to draw a line, a user would have to select the line tool and click on the initial and the final point with a mouse every time. As an exemplary application of this invention, the user can drag a finger on the touchpad while applying pressure on the finger to draw a line. This way of drawing lines can be very useful when drawing curved lines as drawing lines with a finger will draw smoother lines than lines drawn by using a mouse because drawing a curved line with a finger will allow finer adjustments than drawing a curved line with a hand holding a mouse.

Figure 22:
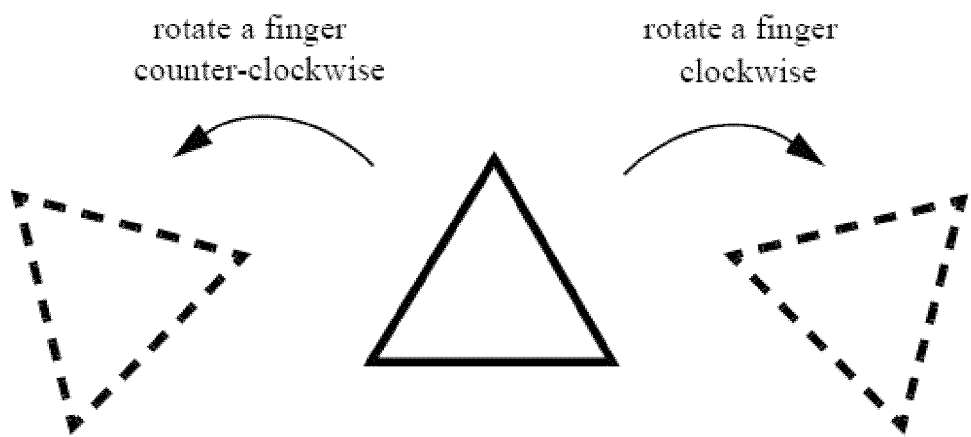
FIG. 22 illustrates an exemplary application of an object being rotated by interpreted gestures of a user in a computer aided design/drafting application.

As another example, to rotate an object, the user can click on the object to have it highlighted and rotate the finger to rotate the object in the corresponding direction. FIG. 22 illustrates an exemplary use of this process in an exemplary application. This feature can be useful to correct pictures that are vertically misaligned; a user can select all of a picture and rotate the finger by desired amount of degrees. Once the picture is vertically aligned, the user can select the best fitting rectangular area of the picture to save. While an object is being rotated, the user can drag the finger around to slide the object around. Recording of such motions can be useful to generate an animation of the moving object. To group objects, the user can pitch two fingers up after the user highlights the objects by tapping on the objects while having a finger of the other hand down on the touchpad. To increase the size of a 2D or 3D object, the user can select an object and rotate two fingers counter-clockwise to decrease the size of the object or rotate two fingers clockwise to increase the size of the object. To increase the thickness of the outline of an object, the user can tap on the outline of the object and rotate two fingers clockwise. To decrease the thickness of the outline of an object, the user can tap on the outline of the object and rotate two fingers clockwise. Similar implementation can be done in word processing applications to increase or decrease the font size. As another exemplary application, to flip an object left or right, the user can click on the object to have it highlighted, tilt a finger left or right, and tap with another finger to have the object flipped left or right. Similarly, to flip an object towards a reflection point, the user can click on the object to have it highlighted, touch the point of reflection with a finger of the other hand, and tilt the finger on the object towards the reflection point.

Mobile Devices

As more functionality gets added as features of mobile devices, menus or controls get complicated. Combined motion control becomes extremely useful in mobile devices whose screen size is limited. Numbers of possible shortcuts increase dramatically by using combination of motions as shortcuts. As an example of application in a mobile phone, a shortcut to "phone" or "calls" mode can be implemented by counter-clockwise rotation of a finger, and a shortcut to applications mode can be implemented by clockwise rotation of a finger on the screen. For mobile devices without detection of vertical or horizontal orientation, detection method can be replaced by having the user rotate a finger on the screen. When the user wants to view pictures sideways on the phone, the user can switch between portrait and landscape mode by rotating a finger on the screen.

As another example, while the phone is being used as music or video player, the user can pitch a finger on the screen forward or backward to control the volume, roll the finger left or right to rewind or fast-forward, or roll the finger left or right while dragging the finger in the same direction to seek to the beginning of the current track or to the next track. When the mobile device is in virtual network computing mode or being used as a remote control, all of the functions described so far can be implemented on the mobile devices.

Combination of motions can also be used as identification on mobile devices. Instead of methods such as entering a security code, a device can be programmed to recognize a series of motions as identification. Identification process can allow users different level of access, for example, calls only mode, child proof mode, or application only mode. When the mobile phone receives a phone call while it is in application mode, a user can make a global gesture to exit the application mode or the touchpad of the phone can be partitioned into sections so one section can control the ongoing application and the other section can control phone functionality. In general, a touchpad user interface can be divided to have each partition control different applications or different control as taught in issued U.S. Pat. No. 6,570,078, pending U.S. patent application Ser. Nos. 11/761,978, US-12/418,605, pending Provisional Patent Application 61/123,217, or other such technology.

In all of the exemplary applications described, the invention provides for any of the cited example postures and gestures to be interchanged with others as may be advantageous in an implementation.

The invention claimed is:

1. A user interface method for use with a touch gesture user interface in a system implementing global or universal gestures and application-specific gestures for the control of software executing on a device comprising a touch user interface and a computational processor, the method comprising Recognizing at least one posture of a finger in contact with a tactile sensor, Recognizing a touch gesture from a plurality of possible touch gestures by recognizing specific changes between postures, the changes comprising at least one recognized change in the angle of finger contact with the tactile sensor, Assigning a user interface function to the recognized touch gesture, Directing executing software to perform a user interface operation associated with the recognized touch gesture, the user interface operation selected from a plurality of possible from a user interface operations, and the association from plurality of possible associations, the plurality of possible associations comprising at least a global type and a second type, the first type of association being common across applications and the second type of association being an application-specific association that is specific to an application executing on the system, and Wherein the executing software is responsive to the recognized touch gesture.

2. The method of claim 1 wherein when a gesture with a context-specific association is recognized, the user interface operation is determined by the application that has a currently active user-interface focus.

3. The method of claim 1 wherein the association is context-specific.

4. The method of claim 1 wherein the tactile sensor is comprised by a touchscreen.

5. The method of claim 1 wherein the gesture is used to control the system.

6. A user interface method for use with a touch gesture user interface for implementing global or universal gestures and context-specific gestures for the control of user applications executing on a device comprising, the method comprising Recognizing at least one posture of a finger in contact with a tactile sensor, Recognizing a touch gesture from a plurality of possible touch gestures by recognizing specific changes between postures, the changes comprising at least one recognized change in the angle of finger contact with the tactile sensor, Assigning a user interface function to the recognized touch gesture, Directing executing software to perform a user interface operation associated with the recognized touch gesture, the user interface operation selected from a plurality of possible from a user interface operations, and the association from plurality of possible associations, the plurality of possible associations comprising at least a global type and a second type, the first type of association being common across the system and the second type of association being an application-specific association that is specific to an application, and Wherein the executing software is responsive to the recognized touch gesture.

7. The method of claim 6 wherein when a gesture with a context-specific association is recognized, the user interface operation is determined by the application that has a currently active user-interface focus.

8. The method of claim 6 wherein the association is context-specific.

9. The method of claim 6 wherein the tactile sensor is comprised by a touchscreen.

10. The method of claim 6 wherein the gesture is used to control the system.

11. A user interface method for use with a touch gesture user interface for implementing global or universal gestures and context-specific gestures for the control of user applications executing on a device comprising, the method comprising Recognizing at least one posture of a finger in contact with a tactile sensor, Recognizing a touch gesture from a plurality of possible touch gestures by recognizing specific changes within postures, the changes comprising at least one recognized change in the angle of finger contact with the tactile sensor, Assigning a user interface function to the recognized touch gesture, Directing executing software to perform a user interface operation associated with the recognized touch gesture, the user interface operation selected from a plurality of possible from a user interface operations, and the association from plurality of possible associations, the plurality of possible associations comprising at least a global type and a second type, the first type of association being common across applications and the second type of association being an application-specific association that is specific to an application, and Wherein the executing software is responsive to the recognized touch gesture.

12. The method of claim 11 wherein when a gesture with a context-specific association is recognized, the user interface operation is determined by the application that has a currently active user-interface focus.

13. The method of claim 11 wherein the association is context-specific.

14. The method of claim 11 wherein the tactile sensor is comprised by a touchscreen.

15. The method of claim 11 wherein the gesture is used to control the system.

16. A user interface method for use with a touch gesture user interface for implementing global or universal gestures and context-specific gestures for the control of user applications executing on a device comprising, the method comprising Recognizing at least one posture of a finger in contact with a tactile sensor, Recognizing a touch gesture from a plurality of possible touch gestures by recognizing specific changes within postures, the changes comprising at least one recognized change in the angle of finger contact with the tactile sensor, Assigning a user interface function to the recognized touch gesture, Directing executing software to perform a user interface operation associated with the recognized touch gesture, the user interface operation selected from a plurality of possible from a user interface operations, and the association from plurality of possible associations, the plurality of possible associations comprising at least a global type and a second type, the first type of association being common across the system and the second type of association being an application-specific association that is specific to an application, and Wherein the executing software is responsive to the recognized touch gesture.

17. The method of claim 16 wherein when a gesture with a context-specific association is recognized, the user interface operation is determined by the application that has a currently active user-interface focus.

18. The method of claim 16 wherein the association is context-specific.

19. The method of claim 16 wherein the tactile sensor is comprised by a touchscreen.

20. The method of claim 16 wherein the gesture is used to control the system.

* * * * *